(12) United States Patent
Sadiq

(10) Patent No.: US 7,848,942 B2
(45) Date of Patent: Dec. 7, 2010

(54) DISTRIBUTION OF INTEGRATED BUSINESS PROCESS MODELS

(75) Inventor: Wasim Sadiq, Westlake (AU)

(73) Assignee: SAP Aktiengesellschaft, Walldorf (DE)

( * ) Notice: Subject to any disclaimer, the term of this patent is extended or adjusted under 35 U.S.C. 154(b) by 1743 days.

(21) Appl. No.: 11/023,311

(22) Filed: Dec. 28, 2004

(65) Prior Publication Data

US 2006/0143611 A1    Jun. 29, 2006

(51) Int. Cl.
G06F 9/00    (2006.01)

(52) U.S. Cl. ................... 705/7; 705/8; 705/9; 707/601; 709/201

(58) Field of Classification Search .................. 705/7–9; 709/201; 707/600
See application file for complete search history.

(56) References Cited

U.S. PATENT DOCUMENTS

| | | | | |
|---|---|---|---|---|
| 5,301,320 | A * | 4/1994 | McAtee et al. .................. | 705/9 |
| 5,490,097 | A * | 2/1996 | Swenson et al. ............... | 703/2 |
| 5,581,691 | A * | 12/1996 | Hsu et al. ...................... | 714/15 |
| 5,836,011 | A * | 11/1998 | Hambrick et al. .............. | 705/8 |
| 5,870,545 | A * | 2/1999 | Davis et al. .................. | 709/201 |
| 5,999,911 | A * | 12/1999 | Berg et al. ..................... | 705/9 |
| 6,002,396 | A * | 12/1999 | Davies ........................ | 715/763 |
| 6,041,306 | A * | 3/2000 | Du et al. ........................ | 705/8 |
| 6,334,141 | B1 * | 12/2001 | Varma et al. ................. | 709/205 |
| 6,397,192 | B1 * | 5/2002 | Notani et al. .................. | 705/9 |
| 6,442,528 | B1 * | 8/2002 | Notani et al. .................. | 705/9 |
| 6,480,876 | B2 * | 11/2002 | Rehg et al. .................. | 718/100 |
| 6,763,353 | B2 * | 7/2004 | Li et al. ............................ | 1/1 |
| 6,772,216 | B1 * | 8/2004 | Ankireddipally et al. .... | 709/230 |
| 6,829,771 | B1 * | 12/2004 | Bahrs et al. .................. | 719/318 |
| 6,968,343 | B2 * | 11/2005 | Charisius et al. .................... | 1/1 |
| 7,065,493 | B1 * | 6/2006 | Homsi ........................... | 705/8 |
| 7,120,896 | B2 * | 10/2006 | Budhiraja et al. ........... | 717/105 |
| 7,143,186 | B2 * | 11/2006 | Stewart et al. .............. | 709/245 |
| 7,184,967 | B1 * | 2/2007 | Mital et al. .................... | 705/8 |
| 7,487,080 | B1 * | 2/2009 | Tocci et al. ................... | 703/22 |
| 7,565,640 | B2 * | 7/2009 | Shukla et al. ............... | 717/105 |

(Continued)

OTHER PUBLICATIONS

Sadiq S., Orlowska, M., Sadiq W., & Foulger C., "Data flow and validation in workflow modelling" (Jan. 1, 2004), Proceedings of the 15th Australasian database conference, p. 207-214, Dunedin, New Zealand.*

(Continued)

*Primary Examiner*—Beth V Boswell
*Assistant Examiner*—Tiphany B Dickerson
(74) *Attorney, Agent, or Firm*—Fish & Richardson P.C.

(57) ABSTRACT

A process modeling tool provides a process designer with the ability to design an integrated business process model that includes a series of tasks for achieving a desired result. The process modeling tool allows the process designer to associate sub-sets of the tasks with entities who will perform the task sub-sets, and to extract distributed process models that each include one of the task sub-sets from the integrated process model for distribution to, and execution by, the various entities. The distributed process models execute independently and in synchronization with one another, and transfer control therebetween as necessary to achieve the result of the integrated process model. Accordingly, the process designer is allowed to use established techniques for the design, verification, and monitoring of the integrated process model, while the entities are allowed to use local process enactment engines for implementing their portion of the overall process.

20 Claims, 35 Drawing Sheets

U.S. PATENT DOCUMENTS

| | | | | |
|---|---|---|---|---|
| 7,603,476 | B1* | 10/2009 | Hofmann et al. | 709/237 |
| 2001/0011295 | A1* | 8/2001 | Kobayashi et al. | 709/201 |
| 2003/0083910 | A1* | 5/2003 | Sayal et al. | 705/7 |
| 2003/0084127 | A1* | 5/2003 | Budhiraja et al. | 709/220 |
| 2003/0097286 | A1* | 5/2003 | Skeen | 705/7 |
| 2003/0120708 | A1* | 6/2003 | Pulsipher et al. | 709/106 |
| 2004/0002944 | A1* | 1/2004 | Hauser et al. | 707/1 |
| 2004/0078105 | A1* | 4/2004 | Moon et al. | 700/100 |
| 2004/0107414 | A1* | 6/2004 | Bronicki et al. | 717/105 |
| 2004/0133457 | A1* | 7/2004 | Sadiq et al. | 705/7 |
| 2004/0133889 | A1* | 7/2004 | Colle et al. | 718/100 |
| 2004/0162741 | A1* | 8/2004 | Flaxer et al. | 705/7 |
| 2005/0086360 | A1* | 4/2005 | Mamou et al. | 709/232 |
| 2006/0075407 | A1* | 4/2006 | Powers et al. | 718/100 |
| 2006/0106846 | A1* | 5/2006 | Schulz et al. | 707/101 |
| 2006/0107265 | A1* | 5/2006 | Schulz et al. | 718/100 |
| 2006/0136924 | A1* | 6/2006 | Sadiq et al. | 718/104 |
| 2006/0143057 | A1* | 6/2006 | Sadiq | 705/7 |

OTHER PUBLICATIONS

Sadiq, S. et al, "Pockets of Flexibility in Workflow Specification" (2001) Lecture Notes in Computer Science, vol. 2224, Conceptual Modeling, pp. 513-526.*

Sadiq, W. and Orlowska, M. "On Capturing Process Requirements of Workflow Based Information Systems" (Apr. 14-16, 1999) In Proceedings of the 3rd International Conference on Business Information Systems (BIS '99), Poznan, Poland, pp. 195-209.*

Sadiq, W. & Orlowska, M., "Analyzing Process Models Using Graph Reduction Techniques" (Mar. 24, 2000) Information Systems vol. 25, No. 2., pp. 117-134.*

Mangan P. & Sadiq, S., "On Building Workflow Models for Flexible Processes" (2002) Proceedings of the 13th Austrailian Database Conference in Melbourne, Australia, p. 103-109.*

Leymann, F., "Business Process Management with FlowMark" (Feb. 28-Mar. 4, 1994) COMPCON Spring '94, Digest of Papers, pp. 230-223.*

Berg, J., "Business Process Integration for Distributed Applications in Radiology" (Sep. 18-20, 2001) Distributed Objects & Application Systems 2001, Rome, Italy.*

Alonso, G. et al., "Distributed Processing over Stand-alone Systems and Applications" (1997) Proceediings of the 23rd VLDB Conference, Athens, Greece, pp. 575-579.*

Barbini, F. et al., "A Workflow Model for Designing and Managing Distributed Business Process in Virtual Enterprises" (Oct. 29-31, 2002) Proceedings of the EurAsia-ICT 2002: Information and Communication Technology, First EurAsian Conference, Shiraz, Iran: pp, 429-433.* van der Aalst, W.M.P., "Inheritance of Interorganizational Workflows: How to Agree to Disagree Without Loosing Control?" (2003) Information Technology and Management 4, 345-389.*

Roseman, M. et al. "Evaluation of Workflow Managmeent Systems: A Meta Model Approach" (Jun. 16-17, 1997), Proceedings of the 2nd CAiSE/IFIP 8.1 Intenational Workshop on Evaluation of Modelling Methods in Systems Analysis and Design, Barcelona, Spain.*

Dong, G. et al., "A Framework for Optimizing Distributed Workflow Executions" (1999).*

* cited by examiner

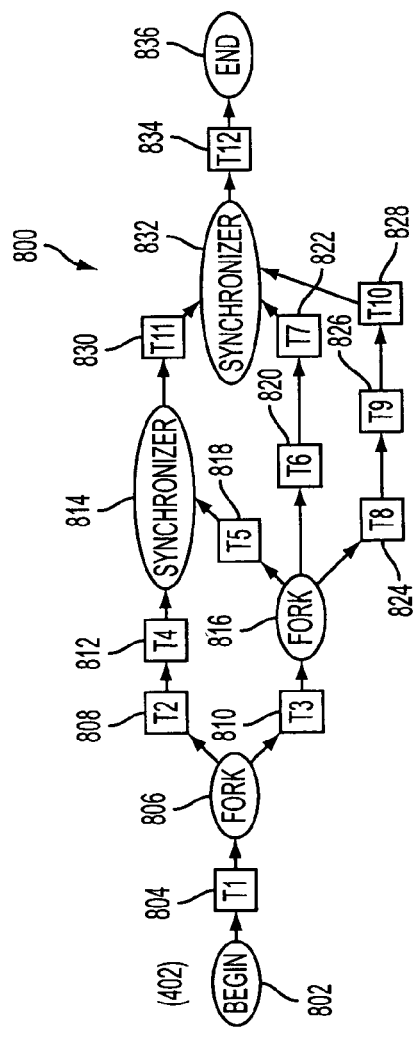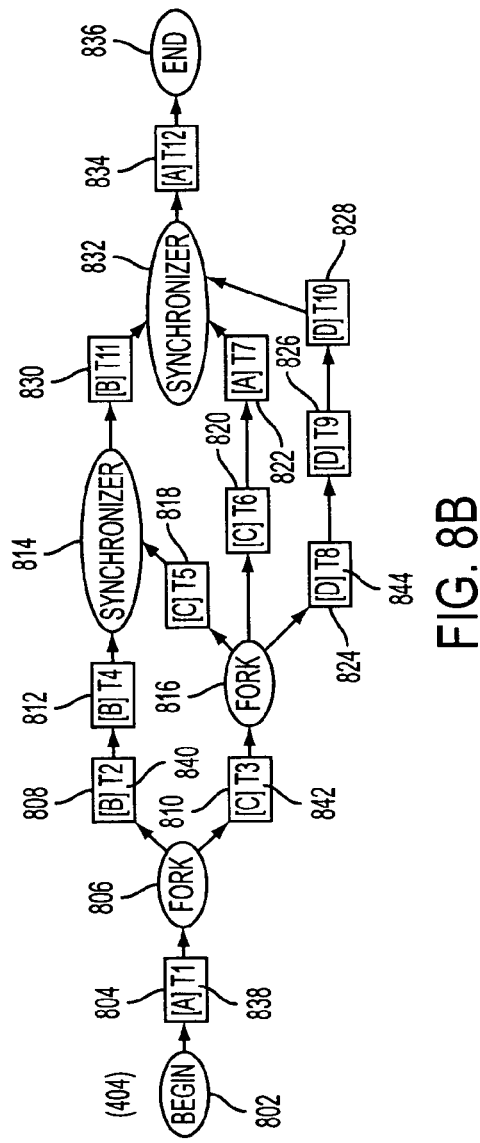
FIG. 8A
FIG. 8B (2302)

(2304), (2306)

(2308)

(2310, 2312)

(2314)

US 7,848,942 B2

DISTRIBUTION OF INTEGRATED BUSINESS PROCESS MODELS

TECHNICAL FIELD

This description relates to business process models.

BACKGROUND

Workflow systems exist that allow enterprises to formalize the processes by which the enterprises achieve their business objectives. Such workflow systems provide step-by-step descriptions of tasks which must or should be performed as part of the workflow, so that individuals or groups within the enterprise can be assigned individual (or groups of) tasks. The tasks may be dependent upon one another; for example, a task may only be begun upon completion of a prior task(s), or tasks may be included in iterative task loops. Additionally, the tasks may have more complex dependencies, requiring application of extensive logic rules to ensure proper completion of the workflow.

Examples of such conventional workflows can be found explicitly or implicitly in almost any enterprise. For example, a manufacturing plant may have a workflow for producing a particular type of good. As another example, an organization selling goods may have a workflow for obtaining the goods, inputting orders and/or payments for the goods, selecting a shipper for shipping the goods, and updating an inventory record based on the sale.

Some workflow systems generally deal only with specific types of pre-defined, static workflows, in which tasks are assigned to human task performers for completion. To the extent that software applications are used in such systems, generally only a basic or minimal level of coordination between the human task performers and the application components is implemented. Moreover, as referred to above, such systems are often implemented in the context of a single enterprise or organization.

In other systems, software applications are integrated into the workflow(s), and human task performers may be involved only for part of the workflow, if at all. Moreover, such systems may cross organizational boundaries by using various existing messaging infrastructures. Such systems may be referred to as business process management (BPM) systems, to reflect a broader context of implementation than is found in conventional workflow systems.

In using such business process models, it may be problematic for one enterprise or organization to interact with another enterprise or organization. Often, tasks of business processes of each enterprise or organization are linked together or combined using an event flow that provides a desired order to the tasks. However, such combined business process models may be difficult to validate or optimize, and may be inflexible in terms of assigning or distributing tasks to the various participants (e.g., each participant is simply performing the tasks of its own business process model). Moreover, a first participant's business process model may have its own nomenclature, semantics, and/or workflow engine (for enactment of the business process model), where none of these are necessarily compatible with a second participant's business process model.

As a result of these and other difficulties associated with integrating and distributing business process models between or among enterprises, collaborations between or among enterprises may be limited. For example, the enterprises may only be able to interact in relatively simplistic manners, so that interactions between the enterprises are limited in quantity and complexity.

SUMMARY

According to one general aspect, a system includes a design tool operable to display an integrated process model that includes a progression of tasks to obtain a desired result, a partition assigner operable to assign a first partition identifier associated with a first entity to a first set of the tasks, and to assign a second partition identifier associated with a second entity to a second set of the tasks, a control transfer identifier operable to determine control transfer points at which, within the progression of tasks, partition assignment changes between the first partition identifier and the second partition identifier, such that a first distributed process model is defined with respect to the first set of the tasks and the first entity, and a second distributed process model is defined with respect to the second set of the tasks and the second entity, and an event flow assignment system operable to insert event flow coordinators into the first distributed process model and the second distributed process model, based on the control transfer points, such that, at run-time, the first distributed process model and the second distributed process model are executed independently and in synchronization with one another to obtain the result of the integrated process model.

Implementations may include one or more of the following features. For example, the control transfer identifier may be operable to traverse the progression of tasks and determine that a source task is associated with the first partition identifier and is in consecutive sequence with a coordinator task that coordinates an order of the progression of tasks, and may be further operable to continue traversing the progression of tasks past the coordinator task until a target task of the source task is reached. The control transfer identifier may be operable to identify a transition between the source task and the target task as a control transfer point, when the target task is associated with the second partition identifier. In this case, the control transfer identifier may be operable to reduce the first distributed process model by removing the second set of tasks therefrom, without removing the coordinator task.

The control transfer identifier may be operable to insert a plug-point task into the integrated process model, based on the control transfer points, and may be further operable to duplicate each of the plug-point tasks to obtain plug-point task pairs. Each of the first distributed process model and the second distributed process model may include one of the plug-point tasks within the plug-point pair. In this case, each of the plug-point tasks within the plug-point pair may be associated with an event identifier that is unique to the plug-point pair.

Further, the event flow assignment system may be operable to transform each of the plug-point tasks forming multiple plug-point pairs into a sender task or a receiver task, such that plug-point task pairs are transformed into sender-receiver pairs, and the event identifier of each of the plug-point pairs may be associated with a corresponding one of the sender-receiver pairs. The event flow assignment system may be operable to determine whether a sender or receiver task replaces a selected plug-point task, based on a direction of event flow between the first distributed process model and the second distributed process model.

The integrated process model may include control flow constraints that maintain an order and validity of the tasks, and the control flow constraints may be maintained with respect to an execution of the first distributed process model and the second distributed process model. The system may include a deployment system for deploying the first distributed process model and the second distributed process model for independent execution on a first process execution engine and a second process execution engine, respectively.

The system may include a monitoring tool for viewing a definition and status of the integrated process model, with respect to an execution of the first distributed process model and the second distributed process model. The tasks of the integrated process model may have a one-to-one relationship with the tasks of the first distributed process model and the second distributed process model.

According to another general aspect, an apparatus has a storage medium with instructions stored thereon, and the instructions include a first code segment for selecting an integrated process model that includes tasks, coordinator tasks governing a progression of the tasks, transitions between the tasks and the coordinator tasks, and control flow constraints for ensuring a validity of execution of the integrated process model for obtaining a result, a second code segment for assigning one of a plurality of partition identifiers, each partition identifier being associated with one of a plurality of entities, to each of the tasks, to thereby associate each of the tasks with at least one of the entities, a third code segment for designating control transfer points at which control transfers between two of the entities by associating each task and its assigned partition identifier with the ensuing partition identifier of each immediately consecutive task, excluding the coordinator tasks, wherever the ensuing partition identifier is different from the assigned partition identifier, and a fourth code segment for extracting distributed process models from the integrated process model, based on the partition identifiers and control transfer points, wherein execution of the distributed process models conforms to the control constraints for, and obtains the result of, the integrated process model.

Implementations may include one or more of the following features. For example, the fourth code segment may include a fifth code segment for inserting sender and receiver event-flow pairs into the distributed process models, wherein the event-flow pairs may govern transfer of control between the entities, to thereby trigger operation of each entity's respective distributed process model.

The fourth code segment may include a fifth code segment for inserting plug-point tasks into the integrated process model, based on the control transfer points, wherein each of the plug-point tasks may include a source partition identifier and a target partition identifier that are determined from a corresponding control transfer point, and a sixth code segment for extracting the distributed process models, based on the plug-point tasks, wherein each plug-point task may be duplicated for inclusion in two of the distributed process models that correspond to the source partition identifier and the target partition identifier.

In this case, the fourth code segment may further include a seventh code segment for transforming one of a pair of the duplicated plug-point tasks into a sender activity, and for transforming the other of the pair of the duplicated plug-point tasks into a receiver activity, based on a direction of the integrated process model. Further, the pair of duplicated plug-point tasks, the sender activity, and the receiver activity may be associated with an event identifier.

The fourth code segment may include a fifth code segment for removing selected tasks from a selected distributed process model having an associated partition identifier, where the selected tasks may be associated with other partition identifiers that are different from the associated partition identifier of the selected distributed process model.

According to another general aspect, a process modeling tool includes a first display window for displaying an integrated process model having task nodes, coordinator nodes, and transitions between the task nodes and coordinator nodes, an interface tool for selecting each of the task nodes and assigning either of a first partition identifier or a second identifier to each of the selected task nodes, a transition identification tool for inserting a transition marker after each task node at which an outgoing transition from a first task node having the first partition identifier is an ingoing transition at a second node having the second partition identifier, excluding the coordinator nodes, a process model generator for generating, from the integrated process model and based on the transition markers, a first distributed process model that includes tasks having the first partition identifier, and a second distributed process model that includes tasks having the second partition identifier, and at least a second window for displaying the first distributed process model and the second distributed process model, in which each of the distributed process models includes the transition markers for demonstrating a transfer of control between the first distributed process model and the second distributed process model.

Implementations may include one or more of the following features. For example, the transition identification tool may be operable to insert the transition marker as a plug-point task that identifies the first partition identifier, the second identifier, and an event identifier. The process model generator may be operable to duplicate the plug-point task for inclusion in both the first distributed process model and the second distributed process model, and may be further operable to transform each of the duplicated plug-point tasks into a sender or receiver event-flow activity. The sender and receiver activities may include the event identifier associated with their respective plug-point tasks, and dictate transfer of process control between the first and second distributed process models.

The details of one or more implementations are set forth in the accompanying drawings and the description below. Other features will be apparent from the description and drawings, and from the claims.

DESCRIPTION OF DRAWINGS

FIGS. 8A-8E are block diagrams of generic process models and tasks used to illustrate a third example of the process of FIG. 4.

DETAILED DESCRIPTION

Figure 1:
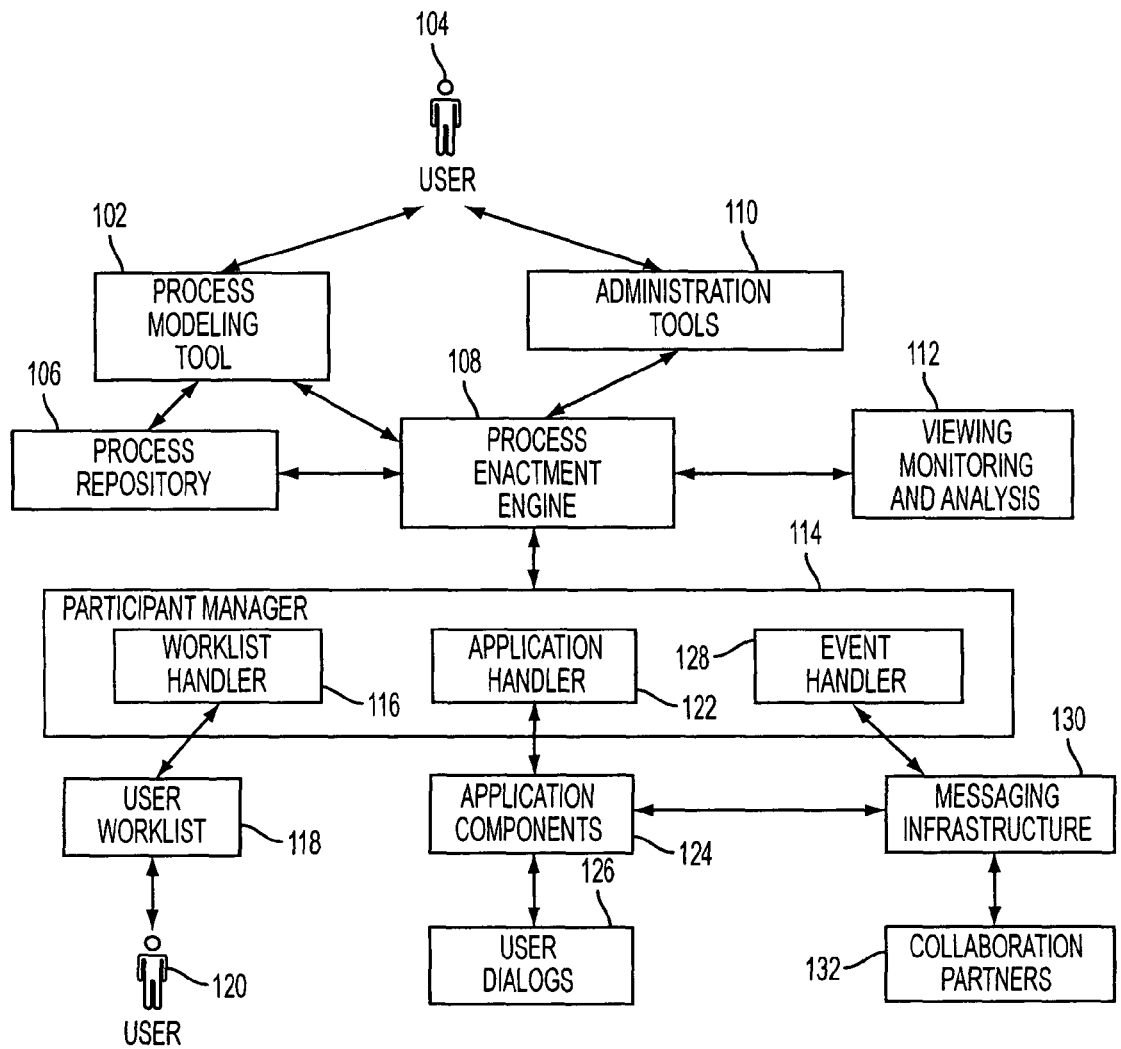
FIG. 1 is a block diagram of a Business Process Management (BPM) system.

FIG. 1 is a block diagram of a Business Process Management (BPM) system 100. In FIG. 1, a process modeling tool 102 allows a user (e.g., a process designer) 104 to design a process model(s) that captures desired business process requirements in the form of, for example, a graphical process model, using the process modeling tool 102.

For example, a process model designed with the process modeling tool 102 may govern tasks associated with a customer return policy that is implemented by a retail store. As such, the process model may include task items for, for example, receiving returned merchandise, ensuring that the merchandise was purchased at the retail store and not at another retail store, ensuring that the merchandise was purchased within a recent, specified time window, crediting the customer's credit card for the purchase amount, updating inventory records, and so on. As discussed above, some of these tasks may be performed by human employees of the retail store, while others of the tasks may be automated tasks that are performed by software applications and/or hardware devices. Of course, innumerable examples of such workflows and process models exist, other than the one just mentioned.

Generally speaking, the process modeling tool 102 supports a Process Modeling Language (PML) that is suitable for capturing and describing necessary business process requirements. Such a PML may include, for example, types or categories of tasks, terminology or semantics for describing the tasks, and coordination tasks for relating tasks to one another (e.g., within a specified event flow). Different examples of PMLs exist, and representative elements of a conventional PML are provided in detail below, for explanatory purposes.

A process repository 106 is used to maintain the process models formulated by the process modeling tool 102 and the process designer 104. A process enactment engine 108 accesses the process repository 106 to create instances of required process models, and to execute them. The PML used by the process modeling tool 102 is assumed to be interpretable by the process enactment engine 108.

In FIG. 1, then, the process enactment engine 108 may access the process repository 106 and/or the process modeling tool 102 in order to obtain an instance of a given process model, and may then execute that instance. The process modeling tool 102 allows the process designer 104 to access the runtime instances of the process models, and, if desired, to make ad-hoc changes in the instances. Further, the process modeling tool 102 allows the process designer 104 to create instances of one-time process models, without having to store such models in the process repository 106. These ad-hoc workflow capabilities provide occasional users and application developers to manipulate and change runtime instances of process models in an effective and accurate way.

Administration tools 110 allow users designated as administrators to ensure smooth operations of the overall environment of the BPM system 100, and to manage exceptional situations and malfunctions. More generally, viewing, monitoring, and analysis tools 112 allow a wider class of users to ensure the timely and effective operations of business processes, in the form of, for example, stand-alone tools or embeddable application components that can be integrated with their respective applications. Further, the viewing, monitoring, and analysis tools 112 also may provide links and input to business intelligence tools for business activity monitoring.

A participant manager 114 manages all of the various types of participants that may carry out work/activities/tasks assigned to them by the process enactment engine 108. In other words, whether an activity is an assignment given to a human performer, an invocation on an application component, a call to web service, a process-oriented message communication between different parties, or some other type of action associated with the process model(s), it should be understood that, in principle, all such requirements simply reflect different aspects of the underlying business process model(s) and its associated activity.

For example, the participant manager 114 includes a worklist handler 116, which receives human-oriented activities from the process enactment engine 108. The worklist handler 116 is operable to allocate such activities to the correct (human) performers, based on, for example, roles and assignment information stored in (or associated with) the underlying process model(s), and by relating such information to organizational structures of an enterprise. A user worklist 118 allows a user (i.e., task performer) 120 to access their individual work items.

An application handler 122 may be used to invoke required functionality of associated applications, to, for example, enable software components 124 that do not require human participation. The application handler 122 invokes functionality of, for example, associated business objects, and exchanges process-relevant data with the process enactment engine 108.

With respect to an activity that may be performed partly by the user 120 and partly by an application, the user worklist 118 has the capability of invoking an application dialog 126 of the activity, using input parameters that are based on the information stored in an underlying activity definition of the process model. This allows the user 120 to, for example, work through the dialogs 126 (supported by business objects) to complete the work assigned to the user 120.

An event handler 128 may be used by the process enactment engine 108 to implement a messaging infrastructure 130 and thereby link application component/services with external parties 132. In this way, business processes and applications may be integrated in an event-driven way, to thereby allow process model instances to act upon external business events, and to cooperate with other business process model systems to achieve a desired effect.

Although the participant manager 114 is shown in FIG. 1 as including the various components that are illustrated and described, it should be understood that other components may be added, in order to extend the capabilities of the process enactment engine 108. Similarly, other components may be added to, or used with, the BPM system 100, in order to implement specialized versions of the BPM system that may be helpful to the implementation of desired process models and business objectives. For example, the process modeling tool 102 also may have has access to business objects and other enterprise information, to thereby build links between process logic in the process model and underlying business logic in the business objects, as discussed in more detail with respect to FIG. 2.

Figure 2:
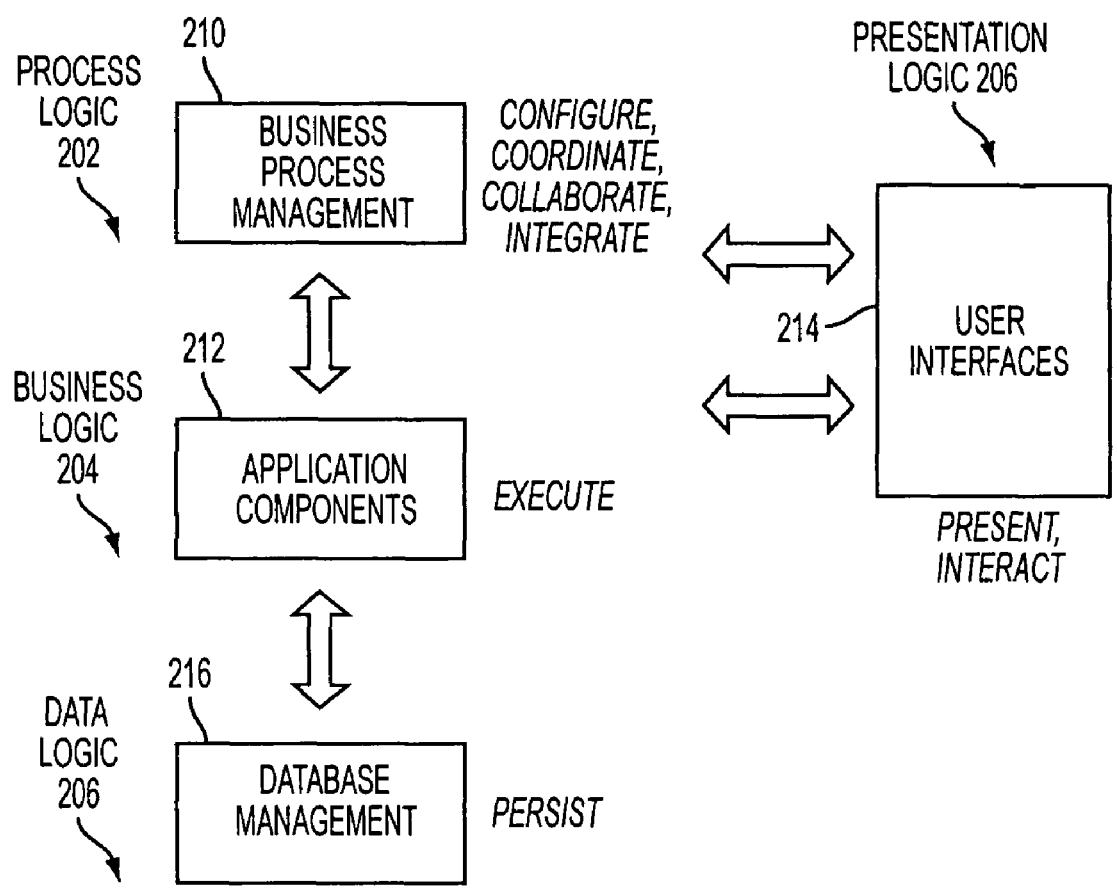
FIG. 2 is a block diagram for Process Oriented Application development and deployment, within which the BPM system of FIG. 1 may be utilized.

FIG. 2 is a block diagram for Business Process Management (BPM) development and deployment, using the BPM system 100 of FIG. 1. In FIG. 2, process logic 202 is separated from business logic 204, although both are accessible by, but separate from, Presentation Logic 206. Data logic 208 also is distinct from all of these components or concepts.

Generally speaking, the process logic 202 includes the design and planning of process models within business process management 210. That is, the process logic includes, in one example, many of the operations and uses of the process modeling tool 102 of FIG. 1, including the configuration and coordination of process models, as well as designs and requirements for collaboration between, and integration of, the process models of various BPM systems.

The business logic 204 includes application components 212, and refers to components for actually executing tasks of business processes. Thus, business processes are primarily captured through modeling, while business logic is primarily implemented through coding of application components. The application components 212 may have minimal direct awareness of one another, and also may have minimal direct awareness of "where and how" they are being utilized within the business processes.

Thus, BPM 210 takes the primary responsibility for achieving particular business objectives through the use of, for example, the application components 212. BPM 210 provides a modeling environment for capturing "real life" business processes with clear mapping and alignment between themselves, as well as a runtime execution environment that may be supported by existing information technology infrastructure. Similar BPM principles may be applied in achieving intra-application, application-to-application, system-to-system, and business-to-business integration User interfaces 214 allow designers, administrators, task-performers, and others to interact with both the BPM 210 component and the application components 212. Database management 216 generally allows for the storage of the process models, business objects, and data used for implementation of the process logic 202 and the business logic 204.

Figure 3:
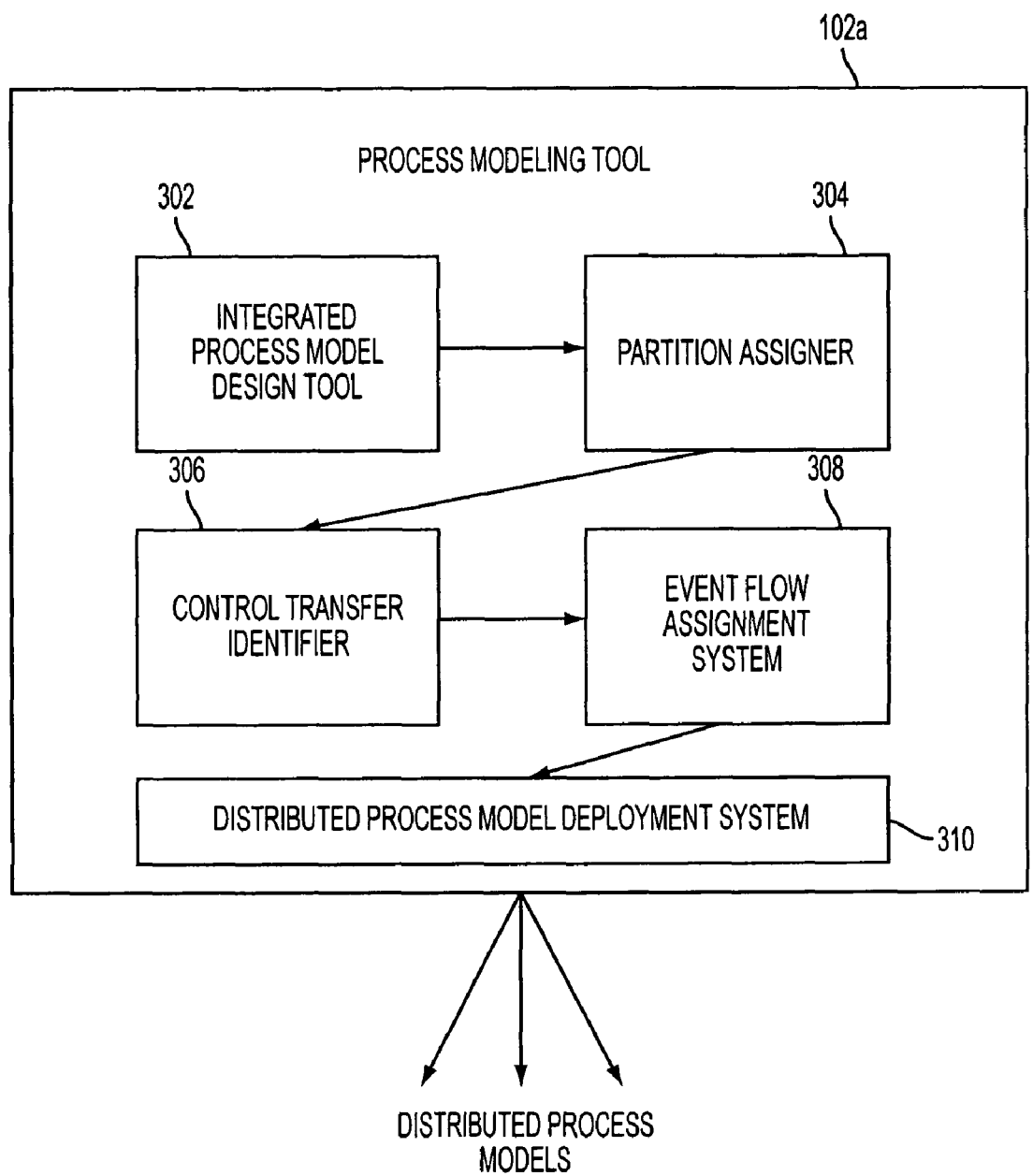
FIG. 3 is a block diagram of an implementation of a process modeling tool of the system of FIG. 1 that is operable to perform automated distribution of integrated process models.

FIG. 3 is a block diagram of an implementation of the process modeling tool 102 of the BPM system 100 of FIG. 1 that is operable to perform automated distribution of integrated process models. In FIG. 3, the designer 104 of FIG. 1 accesses an integrated process model design tool 302 in order to design an integrated process model, as generally described above. That is, the resulting integrated process model is one that includes a plurality of ordered tasks, that is compliant with the PML used by the process enactment engine 108, and that may be executed by the process enactment engine 108 and appropriate ones of the remaining components of the BPM system 100 of FIG. 1.

In FIG. 3, however, the integrated process model is output to a partition assigner 304. The partition assigner 304 assigns, or allows the designer 104 to assign, a partition identifier, or partition, to each of the tasks of the integrated process model. For example, some of the tasks may be assigned a first partition identifier associated with a first employee, while the remaining tasks may be assigned a second partition identifier associated with a second employee. Similarly, two, three, or more partition identifiers may be assigned to corresponding ones of particular departments or organizations. For example, if the designer 104 believes that some of the tasks may best be performed by a Customer Relationship Management (CRM) department, while others of the tasks may best be performed by a Finance Department of the same enterprise, then the tasks may be partitioned accordingly.

In some cases, input from the designer 104 may not be required for an operation of the partition assigner 304. For example, for certain types of process models, and/or certain types of tasks, the partition assigner 304 may be pre-configured to assign partition(s) to the process models and/or tasks that are associated with a particular human performer, application component, process enactment engine, or other designated component. For example, whenever a task(s) is included within the integrated process model that involves a return of purchased merchandise, the partition assigner may automatically assign a partition to such a task that is associated with the CRM and/or finance department(s).

Once partitions are assigned to the integrated process model, a control transfer identifier 306 may be used to identify points within the integrated process model at which control of the process model is transferred from one partition to another. In this regard, it should be understood that there are various aspects that generally characterize a process model. Examples include control flow, data flow, participant assignment, exception handling, temporal constraints, transaction events, and messaging events.

Control flow, in particular, refers to the flow of execution from one task to another within one process model definition. That is, the tasks within a process model are generally interrelated in such a way that the initiation of one task is dependent on the successful completion of a set of other tasks, so that the order in which the tasks are executed is an instrumental feature in ensuring that the business objective of the process model is attained. Generally speaking, as seen below, control flow assumes that a designer or user of a process model has knowledge not only of tasks that have been performed up to a certain point, or of some sub-set of tasks, but of all tasks within the process model, including coordination between, and selection of, particular tasks.

Thus, by appropriately assigning a control flow between the partitions, as described in more detail below, the control flow identifier 306 may separate the operation of a first (sub-)process model associated with the first partition from the operation of a second (sub-)process model associated with the second partition, while ensuring that the overall control flow of the integrated process model is maintained. For example, for an integrated process model related to a customer return of merchandise, wherein partitions have been assigned to a CRM department and a Finance department of an enterprise, the control flow identifier may ensure that the CRM performs its partitioned tasks in order, while the Finance department similarly performs its partitioned tasks in order, and, simultaneously, that the overall "merchandise return" process model maintains its own order, functionality, and result.

Once the control flow(s) are identified in this way, an event flow assignment system 308 inserts actual sender and receiver events into the integrated process model, between partition transitions and based on the direction of event flow between the partitioned process models. In this way, a progression of actual task enactment may be passed back and forth between the partitioned process models.

Event flow, in contrast with control flow, does not assume that a process designer or user of a particular process model has knowledge of all tasks to be performed. For example, a sender event, as will be seen, transfers control from a first entity to a second entity, and the first entity does not require detailed knowledge of the operations of the second entity (i.e., an associated process model). Rather, the first entity is simply required to wait until control is transferred back from a sender event at the second entity to a receiver event of the first entity, in order to progress further within a particular process model.

A net effect of the described operations is to identify two or more separate, partitioned process models, that may be distributed or deployed to appropriate entities for execution thereof. Specifically, the partitioned process models are distributed to the entities on which the original partition assignments were based, for enactment by those entities, by a distributed process model deployment system 310.

For example, in the example of a customer return of merchandise referred to above, a first distributed process model may be deployed to the CRM department, while a second distributed process model may be deployed to the Finance department. In this way, departments, persons, or other entities may perform those tasks at which they are most efficient and effective, while an overall process flow is not compromised or risked. Operation(s) of the distributed process models transfers back and forth between the two (or more) process models, based on the event flow assigned by the event flow assignment system 308. Otherwise, the distributed process models operate essentially independently of one another, in that none of the associated entities (e.g., the CRM department or the Finance department) are required to know anything of the other's operation, except for information that is received as part of the event flow.

Thus, an operation of the process modeling tool 102 of FIG. 3 may be differentiated from existing concepts for distributing tasks among partners or collaborators. For example, the technique(s) described herein allow for a construction of an integrated process model, in much the same way that a typical process model may be constructed. Thus, existing tools may be used in the area of process model construction.

In contrast, existing approaches for integrating distributed process models assume that (distributed) process models for integration already exist within an enterprise or organization, and must be joined together. Such approaches may build upon "bottom up" concepts, i.e., may model individual process models, and then manually link them up through, for example, event management or nesting control flow structure.

The process modeling tool of FIG. 3 enables a "top down" approach for integrated process modeling and distributed process model execution, in which, as described, distributed process models may be automatically generated from an integrated process model, and linked for execution. Accordingly, the process designer 104 may model an integrated or global process model within a specific context, with the general assumption that all process model activities may be executed in a single process execution engine as a single process instance.

Then, the process designer 104 may use the process modeling tool supporting this approach to automatically distribute the integrated process model into the various process models, depending on the partitions specified by the partition assigner 304. The process designer 104 may change the partitions in the integrated process model, using the partition assigner 304, depending on, for example, changing business needs, and, thereafter, use the process modeling tool 102 again to regenerate new distributed process models.

As described in more detail below, the process modeling tool 102a of FIG. 3 supports one-to-one mapping from integrated process models activities to distributed process model activities. The operation of the process modeling tool 102a and the resulting distributed process models also require minimal or no changes to the underlying process enactment engine(s) 108 for executing distributed process models.

Moreover, the resulting distributed process models may be deployed and executed within the same process enactment engine, different process engines within the same organization, or several process engines across organizations. Additionally, the integrated process model may be used for high-level visualization and monitoring of the process as a whole, while the distributed process models may simultaneously be used for actual execution of the process(es).

Techniques exist for ensuring the correctness of a defined business process, which may be a difficult task, particularly for large organizations or complicated processes. To the extend that approaches have been developed that may be used to verify, validate, and optimize business processes, they are generally effective on integrated process models, and may not be applicable to discrete process models that have been joined together.

Thus, with the process modeling tool 102a of FIG. 3, the process designer 104 may make use of these existing approaches to analyze, verify, refine, and improve the integrated process model. Once the process designer 104 is satisfied with the integrated process models, he/she can use the process modeling tool 102a to extract distributed process models for each of the partitions that have been associated with tasks of the integrated process model.

The process modeling tool 102a of FIG. 3 is applicable in many scenarios, some examples of which are provided below. For example, in a business-to-business collaboration, each business partner may want to execute its own part of the collaborative business process, using its own business process execution environment. However, all partners may want to define integrated collaborative process model together for global analysis and visualization. In this case, they can use the process modeling tool 102a of FIG. 3 to model a common process model, and then extract their own distributed process model for local execution.

During the course of collaboration, the partners may want to change the responsibilities and allocation of process activities from one partner to another. In this case, the integrated process model may be updated with new partitions, so that new distributed process models may be extracted. Distributed process model(s) changes or alterations, such as, for example, adding new tasks or removing existing tasks, also may be introduced at the integrated process model level, so that the impact of such changes may effectively be analyzed at the integrated process model level, before automated distribution.

Within a single organization, the process modeling tool 102a may be used to distribute the integrated process model for different departments. In this case, the distributed process models may be executed within in a single process enactment engine 108, or within several engines, while still ensuring the overall process model control flow constraints through an integrated process. In this case, each department may be enabled to use its own distributed process model for local monitoring and execution purposes.

Further, the above techniques refer to the distribution of local process models for execution of associated tasks. However, the process modeling tool 102a also may be used to extract distributed process models only for the purpose of visualization and monitoring, even if the integrated process model is used for execution. By providing such a global view, efficiencies of operation may be increased. For example, without such a global view, it may occur that two partners are each unwittingly waiting for the other to complete a particular task or goal, when, in fact, one of the partners should be proceeding. A global view in such scenarios allows partners to observe that the process as a whole has stalled, so that appropriate action may be taken.

Figure 4:
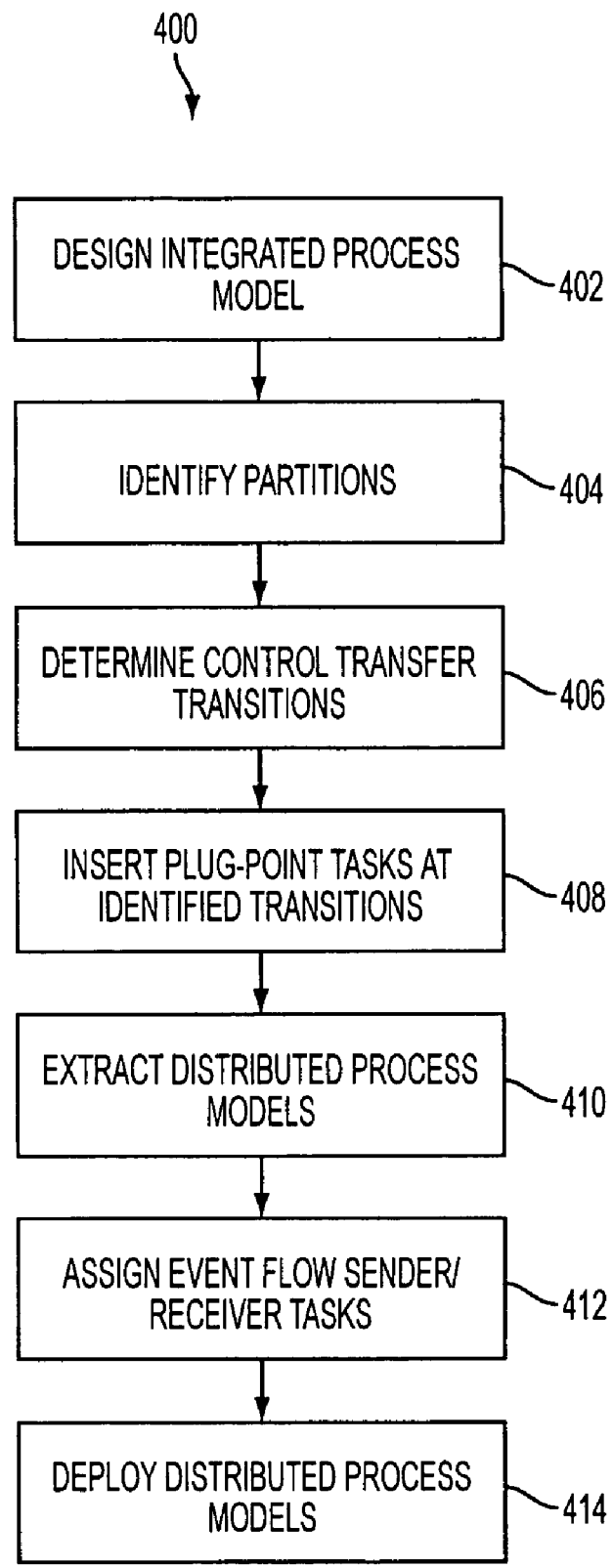
FIG. 4 is a flowchart illustrating a process used by the process modeling tool 102a of FIG. 3 for generating distributed process models.

FIG. 4 is a flowchart 400 illustrating a process used by the process modeling tool 102a of FIG. 3 for generating distributed process models. In FIG. 4, the process designer 104 designs and constructs an integrated process model (402), using tasks from all participants (i.e., from all entities to whom distributed process models will be deployed). As explained, the process designer 104 does not need to consider which of the entities will perform which tasks, or how to maintain a control flow between the tasks, or how to maintain an event flow between the distributed process models. Instead, the process designer 104 designs, tests, and verifies the integrated process model as a single process model.

Then, a partition or partition identifier is associated with each task within the process model (404). For example, if there are three entities to whom distributed process models ultimately will be deployed, then one of three corresponding partition identifiers will be assigned to each of the tasks in the integrated process model. As a result, each of the tasks of the integrated process model will be associated with a partition id corresponding to one of the three entities.

Assignment of the partition identifiers leads to an assignment of control transfer transitions (406), where control of the process model(s) transfers from one partition/entity to another. As described in more detail below, one technique for identifying control transfer transitions is referred to as the "plug-point identification algorithm," where the term "plug-point" refers to the fact that tasks (referred to as "plug-point" tasks) are inserted or "plugged" into the integrated process model at the control transfer transitions (408), and ultimately used to coordinate event flow between the partitions/entities, i.e., between the distributed process models. For example, such plug-point tasks effectively serve as marker or placeholder tasks for later insertion of event flow coordinators (e.g., sender/receiver pairs).

Next, the actual distributed process models are extracted from the integrated process model (410). That is, the group of tasks associated with each partition are defined as a distributed process model.

Then, the plug-point tasks previously inserted are transformed into event flow tasks (412). That is, for example, the plug-point tasks are transformed into send/receive tasks, where the assignment of a particular plug-point task as a send or a receive task is based on an event flow of the distributed process models.

Finally, the distributed process models are deployed to process enactment or execution engines (414). There, the distributed process models are executed and achieve the same functionality and objective as (would) the integrated process model itself.

FIGS. 5A-5F are block diagrams of generic process models and tasks used to illustrate a first example of the process 400 of FIG. 4. In FIGS. 5A-5F and hereafter, reference numerals 402-414 are used to associate illustrated process models and/or tasks with the process 400.

Figure 5A:
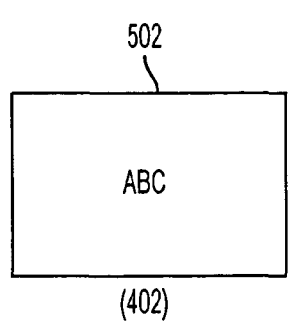
FIGS. 5A-5F are block diagrams of generic process models and tasks used to illustrate a first example of the process 400 of FIG. 4.
Figure 5B:
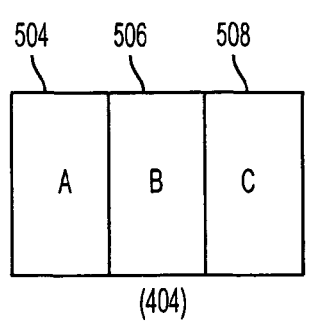
Figure 5C:
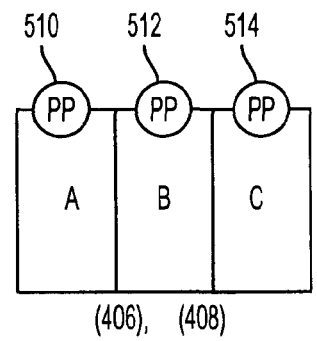

In FIG. 5A, then, an integrated process model 502 is constructed (402) that includes tasks A, B, and C. Partitions 504, 506, and 508 are assigned (404) in FIG. 5B to correspond to the tasks A, B, and C, respectively. Then, in FIG. 5C, plug-point tasks 510, 512, and 514 are inserted at the point(s) of identified control transfer transitions (406, 408).

Figure 5D:
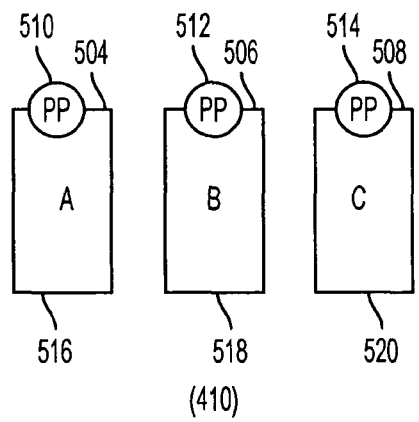
Figure 5E:
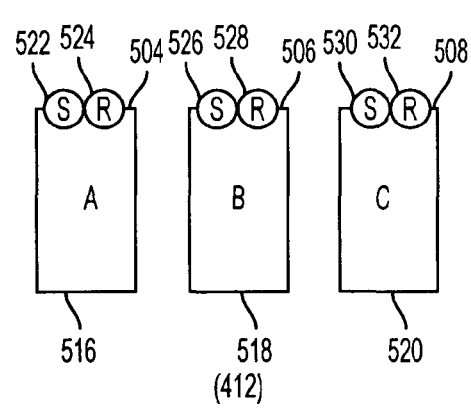

FIG. 5D illustrates the distribution of three process models 516, 518, and 520 (410), within which the plug-point tasks 510, 512, and 514 are assigned to event flow send/receive events 522/524, 526/528, 520/532, respectively (412). In this way, an event flow between the process models 516, 518, and 520 is "sent" from the distributed process model 516 to one or both of the distributed process models 518 and/or 520, and is "received" back at the distributed process model 516 from one or both of the distributed process models 518 and/or 520.

Figure 5F:
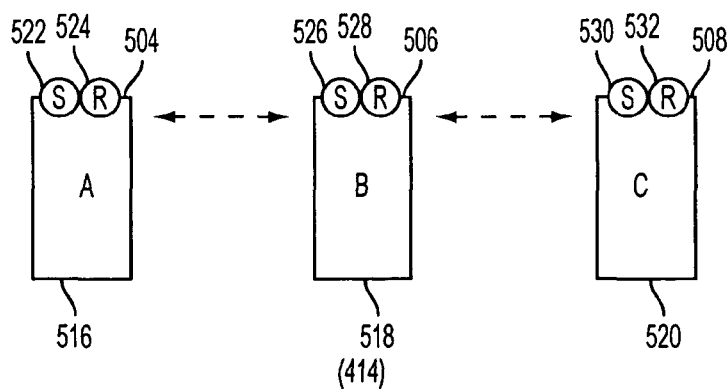

In FIG. 5F, the distributed process models 516, 518, and 520 are deployed in the one or more process enactment engines (414). As should be understood from the above, the sender/receiver tasks 522532 ensure correct inter-process coordination (event flow), while control flows within each of the process models 516, 518, and 520 ensure correct intra-process coordination.

Figure 6:
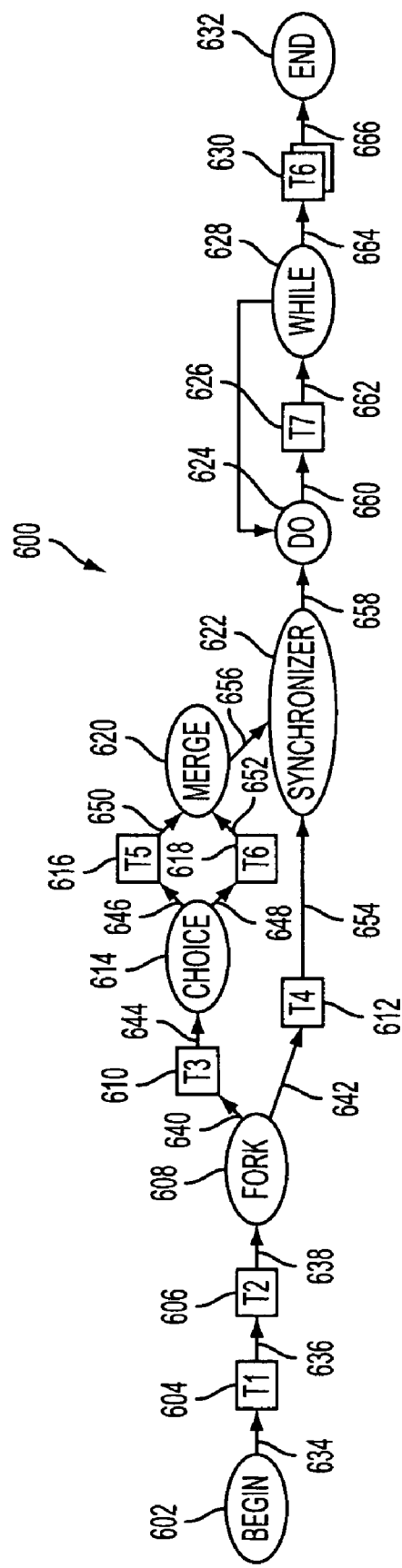
FIG. 6 is a block diagram of a process model for illustrating a generic process modeling language (PML).

FIG. 6 is a block diagram of a process model for illustrating a generic process modeling language (PML). The described PML is not intended to be representative of many or particular PMLs, nor is it intended to provide a complete example of a PML. Rather, the described PML is intended merely to provide a framework for commonly-understood syntax and semantics of workflow modeling languages, using relatively generic and well-established constructs and task names/categories, in order to better illustrate and explain the example process models discussed below with respect to FIGS. 7-29.

In this context, a process model is defined as a directed graph G 600. There are two types of nodes in graph G 600, and that appear in ensuing figures: task nodes (shown as rectangles) and coordinator nodes (shown as ellipses). Each node is associated with at least one incoming and an outgoing transition (except for nodes at the beginning or end of a process or sub-process).

Each node and transition (which together may be referred to as an object) of the process graph G 600 generally has some associated attributes. These attributes may be, for example, singular values or sets of other values or objects. The attributes may be used to define modeling structures, as discussed in more detail below.

Attributes of objects may be accessed using the attribute name followed by the name of the object in square brackets, i.e., an attribute definition is of the form a[o]=v, where a represents the name of a particular attribute of object o and v represents the value of the attribute. If the value of an attribute is a singular value, its name starts with a lower case alphabetical letter. If value is a set, the name starts with an upper case letter.

Thus, the process graph 600 G=(N, T) is a simple directed graph in which N is a finite set of nodes 602-632 representing vertices of the graph, and T is a finite set of transitions 634-666 representing directed edges between any two nodes of the graph 600. The term size[P]=size[N]+size[T] represents the total number of nodes and transitions in P.

For each transition t∈T, following basic attributes are defined as follows:
  fromNode[t]=n where n∈N represents from node of t; and
  toNode[t]=n where n∈N represents to node of t.
For each node n∈N, following basic attributes are defined:
  nodeType[n] ∈{TASK, COORDINATOR} represents type of n.
  coordinatorType[n] ∈{BEGIN, END, CHOICE, MERGE, FORK, SYNCHRONIZER, DO, WHILE}
  taskType[n] ∈{ACTIVITY, SUBPROCESS, PLUG-POINT, SENDER, RECEIVER}
  dout[n]=out degree of n, i.e., number of outgoing transitions from n.

din[n]=in degree of n, i.e., number of incoming transitions to n.

OutTrans[n]={t:t∈T and fromNode[t]=n}, i.e., a set of outgoing transitions from n.

InTrans[n]={t:t∈T and toNode[t]=n}, i.e., a set of incoming transitions to n.

OutNodes[n]={m:m∈N and ∃t∈T where fromNode[t]=n and toNode[t]=m}, i.e., a set of succeeding nodes that are adjacent to n.

InNodes[n]={m:m∈N and ∃t ∈T where toNode[t]=n and fromNode[t]=m}, i.e., a set of preceding nodes that are adjacent to n.

In FIG. 6, the following specific modeling structures are illustrated. First, a Sequence structure or execution takes place when a task or coordinator in the workflow is triggered after the completion of a previous node. A node in a sequence structure has exactly one incoming and one outgoing transition. The tasks T1 604 and 606 T2 show a sequential configuration in the example of FIG. 6.

The fork structure or execution occurs at a task fork coordinator or an "AND-SPLIT" task, such as the fork task 608 of FIG. 6. Such a task facilitates the concurrent triggering of all nodes on its outgoing flows or transitions 640 and 642. Generally, a fork coordinator has exactly one incoming transition and two or more outgoing transitions. In FIG. 6, the fork task 608 triggers tasks T3 610 and task T4 612 after (and dependent on) completion of task T2 606.

The concurrent triggering does not necessarily indicate the concurrent execution or completion of the triggered tasks T3 610 and T4 612. To the contrary, the tasks that reside on the multiple branches of a fork's outgoing flows, represent a lack of control dependency. That is, the tasks T3 610 and T4 612 have no control flow dependency on each other. In other words, these tasks will be initiated at one time, but the execution and completion of one, will not impact on the execution and completion of the other.

The synchronizer coordinator 622, also referred to as an "AND-JOIN" task, joins parallel paths introduced by the fork coordinator 608. The synchronizer coordinator 622 waits for all incoming flows to be triggered, before allowing the control flow to progress further. Thus, the synchronizer 622 synchronizes multiple parallel branches of control into a single flow. Synchronizer nodes generally have two or more incoming transitions and exactly one outgoing transition. In FIG. 6, the synchronizer coordinator 622 waits for the task T4 612 on one branch, and the tasks T3 610 followed by the task T5 616 or (due to the choice-merge construct, as discussed below) the task T3 610 followed by the task T6 618 on the other branch.

The choice coordinator 614, also referred to as "OR-SPLIT," represents alternative execution paths within the process. For example, in FIG. 6, only one of the tasks T5 616 or T6 618 will be executed in a given instance of the process model 600. Like the fork coordinator 608, the choice coordinator 614 generally has exactly one incoming transition and two or more outgoing transitions.

Thus, the choice coordinator 614 represents a point in the process model 600 where one of several branches is chosen based upon the results of a condition. Each condition is a Boolean expression based on workflow relevant instance data. The process seeks to ensure exclusivity and completeness of the conditions.

The merge coordinator 620, also called "OR-JOIN," is the opposite of the choice construct 614, and merges the multiple branches introduced by one or more choice coordinator(s). A merge thus allows the process to proceed when any one of its incoming flows is triggered. In other words, it allows alternate branches to come together without synchronization. Like the synchronizer 622, the merge coordinator 620 generally has a single outgoing transition and two or more incoming transitions.

The begin coordinator 602 identifies the starting point of the process model 600. Typically, the execution of the task(s) immediately following the begin node 602 (for example, the task T1 604 in FIG. 6) will represent the first activity in the process.

The end coordinator 632 contemplates that, in general, a process may have multiple termination tasks, due, for example, to the presence of choice and/or fork coordinators. There are two approaches in this regard: The first one is where all multiple branches of a process are joined (merge/synchronize) before the end, thus resulting in a single termination node. Another approach is not to merge/synchronize to these branches, thus resulting in multiple ending tasks. Each approach has its advantages. In many cases, the joining of paths also may not conveniently be possible for particular modeling approaches.

Nesting is a technique or structure used to simplify the workflow specifications through abstraction. For example, for each execution of the nested task T8 630, the underlying workflow is executed. Nesting, or the use of sub-processes, also promotes reusability.

Iteration refers to repeated execution of a set of workflow task(s) (e.g., in FIG. 6, the task T7 626) may be executed repeatedly. Iterative structures are generally represented through a do-while or repeat-until structure, and introduce cycles in the workflow graph. It is also possible to introduce arbitrary cycles through choice and merge coordinators.

FIGS. 7A-7E are block diagrams illustrating a distribution of distributed process models from an integrated process model. Thus, FIGS. 7A-7E provide a second example of the process 400 of FIG. 4, and the reference numerals used with respect to FIG. 4 again are used within FIGS. 7A-7E. That is, FIGS. 7A-7E, and following examples, provide more detailed implementations of the process 400 of FIG. 4, using the process modeling tool 102a of FIG. 3.

Figure 7A:
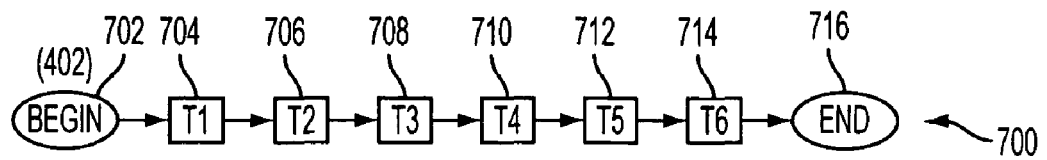
FIGS. 7A-7E are block diagrams illustrating a second example of the process of FIG. 4 for a distribution of distributed process models from an integrated process model.
Figure 7B:
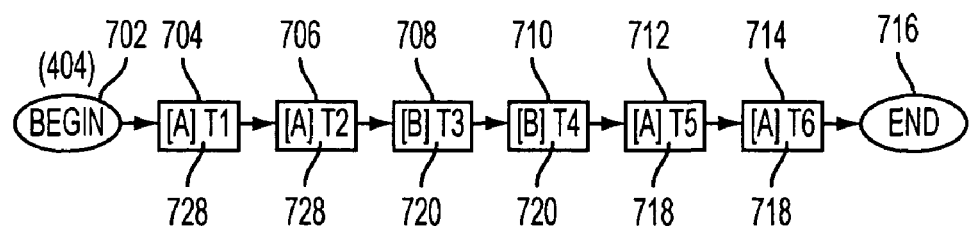

In FIG. 7A, an integrated process model 700 is illustrated having tasks 702-716, which for the sake of example and simplicity, include only sequential structure(s) within the tasks 704-714. In FIG. 7B, the six tasks 704-714 are each assigned a partition identifier A 718 or B 720, the two of which correspond to associated partition entities. That is, a first entity corresponds to the partition A 718, while a second entity corresponds to a second partition B 720. In this way, the tasks 704, 706, 712, and 714 are partitioned from the tasks 708 and 710, for performance by the separate entities.

Figure 7C:
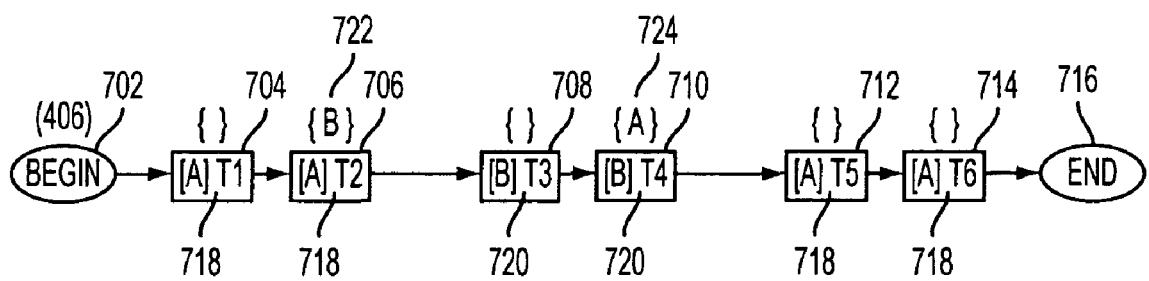

In FIG. 7C, control transfer transitions are identified. That is, tasks at which control is transferred from a first partition (entity) to a second partition (entity) are identified, as indicated by transition identifiers 722 and 724. For example, the transition identifier 722 is labeled with the partition identifier "B" and associated with the task 706, because control transfers from partition A to partition B at the task 706. Similarly, the task 710 is associated with the control transfer identifier "A" 724, since control transfers after the task 710 to the task 712, which has the partition identifier A 718. Stated differently, a set of partitions is attached to each task representing partitions of the activities that immediately follow the particular task and that belong to a different partition than that task. All other tasks are attached with empty sets.

Figure 7D:
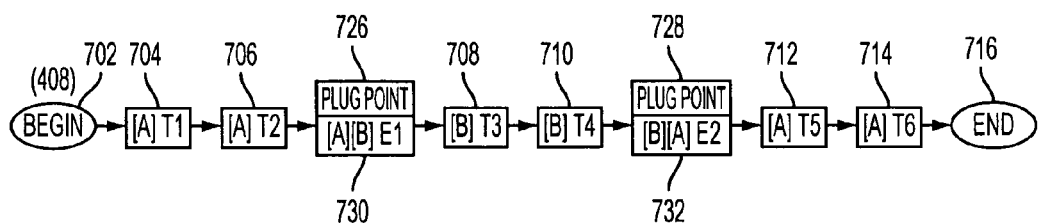

In FIG. 7D, plug-point tasks 726 and 728 are inserted after tasks with non-empty sets of control transfer identifiers, specifically, after tasks 706 and 710 in FIG. 7D. Further, each of the plug-point tasks 726 and 728 also may be attached with a unique event id 730 and 732, respectively. As described below, the event id's 730 and 732 may be useful in achieving inter-process integration (i.e., integration between distributed process models) through event flows, using, in the examples below, sender/receiver event-flow coordinators.

Figure 7E:
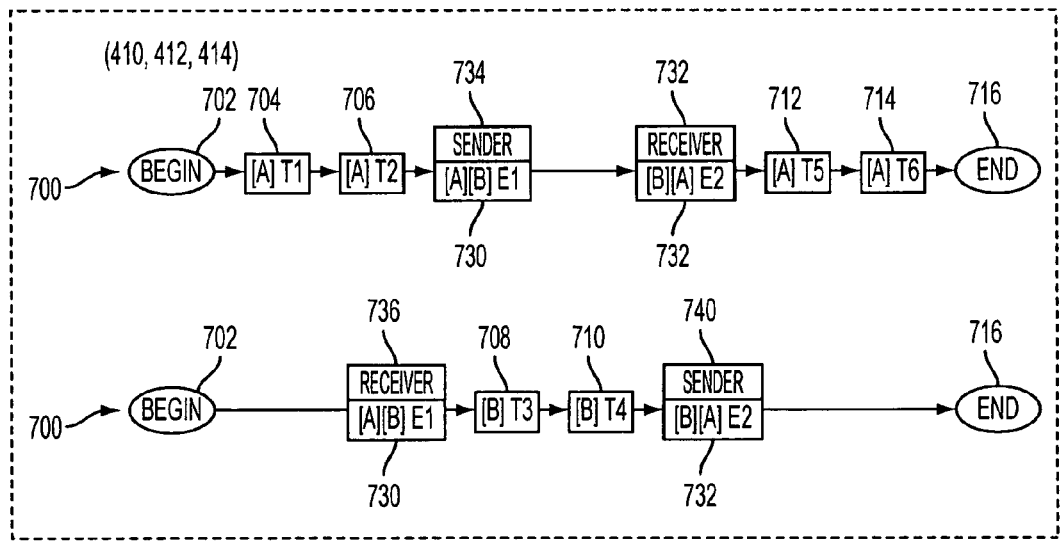

In FIG. 7E, two distributed process models 700a and 700b are extracted to correspond to the partitions A 718 and B 720. Then, tasks 708 and 710, which do not belong to partition A 718, are removed from the process model 700a.

Similarly, in the process model 700b for partition B 720, the tasks 704, 706, 712, and 714 are removed, since these tasks do not belong to partition B. At this stage, the two plug point tasks 726 and 728, as well as all coordinator nodes, if any, are maintained for each of the two partitions. That is, the plug-point tasks 726 and 728 are temporarily duplicated within each of the distributed process models 700a and 700b (although not specifically illustrated in FIG. 7E, which shows, as discussed below, the transformation of the plug-point tasks 726 and 728 into sender/receiver tasks 734-740).

This removal of tasks may result in redundant structures within the distributed process model(s). Thus, as part of the separation of the distributed models 700a and 700b from the integrated process model 700, reduction principles may be used to achieve syntactically correct process models that are equivalent to the automatically-generated distributed process modes, but that are smaller in size. Techniques for this operation are described in more detail below.

The plug-point tasks 726 and 728, as mentioned above, are converted to sender/receiver tasks 734/736 and 738/740, respectively. The determination of which plug-point task becomes a sender coordinator and which becomes a receiver coordinator is determined by the control flow direction. For example, since the control is transferring from partition A 718 (at the task T2 706) to partition B 720 (at the task T3 706), the plug-point E1 726 is converted to a sender activity in the distributed process model 700a and to a receiver activity in the distributed process model 700b.

Finally, in FIG. 7E, the two distributed process models A 700a and B 700b are ready to be deployed in the process execution engine. It should be understood that the example of FIGS. 7A-7E presents a simple example. Determination of control flow transitions, assignment of plug-point tasks, and determination of event flow directions (i.e., sender/receiver events) may be significantly more problematic in the context of more complicated integrated process models, and examples of such process models are provided in more detail, below.

Figure 8C:
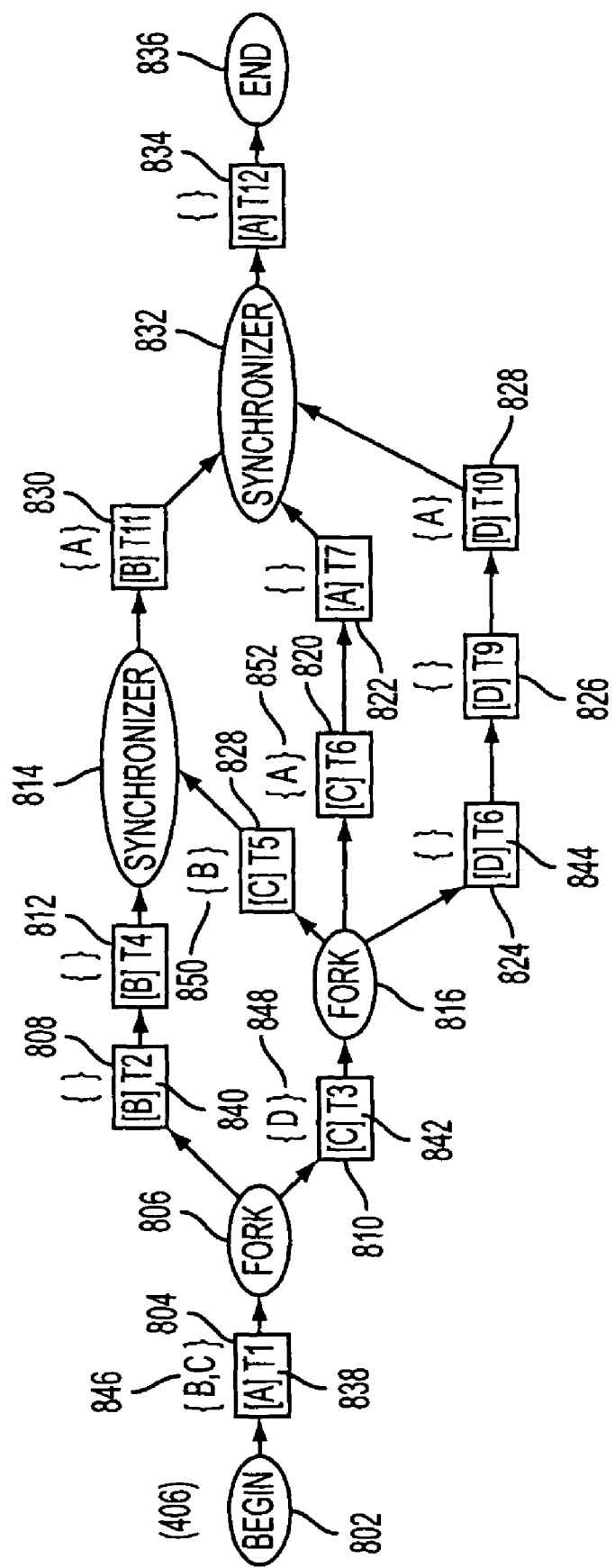

FIGS. 8A-8E are block diagrams of generic process models and tasks used to illustrate a third example of the process 400 of FIG. 4. In FIG. 8A, an integrated process model 800 is illustrated having tasks 802-836. In FIG. 8B, the tasks 804, 822, and 834 are each assigned a partition identifier A 838. The tasks 808, 812, and 830 are assigned partition identifier B 840. The tasks 810, 818, and 820 are assigned a partition identifier C 842. Finally, the tasks 824, 826, and 828 are assigned a partition identifier D 844. As should be apparent from the explanation above, the partition identifiers A 828, B 840, C 842, and D 844 represent corresponding entities that are to receive and perform distributed process models.

In FIG. 8C, control transfer transitions are identified, as indicated by transition identifiers 846, 848, 850, and 852. For example, the transition identifier 846 is labeled with the partition identifier "C, B" and associated with the task 804, because the fork coordinator 806 is a task at which control is transferred from partition A 838 to partition B 840 at the task 808, and from the partition A 838 to partition C 842 at the task 810.

Similarly, the task 810 is itself associated with the control transfer identifier D 848, since control transfers after the task 810 to the task 824, which has the partition identifier D 844. The task 828 is associated with the control transfer identifier B 850, since control transfers after the task 828 to the task 830, which has the partition identifier B 840. The tasks 820, 828, and 830 are associated with the control transfer identifier A 852, since control is transferred after each of these tasks to tasks associated with the partition identifier A 838. All other tasks are attached with empty sets.

Thus, each task is assumed to have one outgoing transition that is linked to either a coordinator node or a task node. In simple sequential structures (e.g., all of process model 700 of FIG. 7A), if the target node of a control transition belongs to a different partition than its source node, then it is considered to be a control transfer transition. If both nodes belong to the same partition, then the transition belongs to the same partition and has no impact on identification of control transfer identifiers.

In more complex cases, where a target node is a coordinator, such as in the process model 800 of FIG. 8C, the process graph 800 may be traversed until a task node is reached. For example, the target node 806 of the task 804 is a fork coordinator node. In this case, as here, there may be more than one task node (i.e, tasks 808 and 810) to compare with the source task (804) of the transition, in order to determine whether it is a control transfer transition.

Thus, as explained, an outcome is that each task node is attached with a set of partition ids consisting of partition ids of the task nodes that immediately follow it and do not belong to the same partition as itself excluding the coordinator nodes. In the immediate example, then, the task 804 with the partition id 838 is associated with control transfer identifier {B, C} 846 associated with partition identifier B 840 of the task 808, as well as the partition identifier C 842 of the task 810.

Figure 8D:
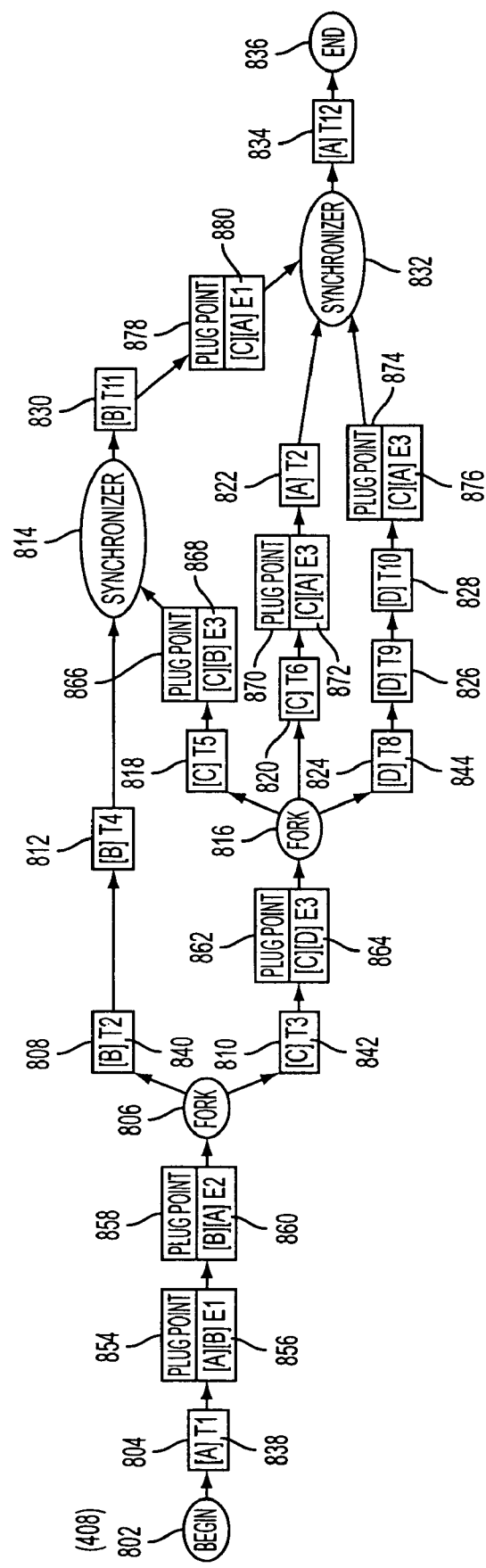

In FIG. 8D, plug-point tasks 854 and 858, corresponding to the control transfer identifier 846 (i.e., transferring control from partition A 838 to both partition B 840 and partition C 842) is inserted after the task 804, and associated with event ids E1 856 and E2 860, respectively. Similarly, plug-point tasks 862, 866, 870, 874, and 878 are inserted after tasks with non-empty control transfer identifiers associated with event ids 864, 868, 872, 876, and 880, respectively.

FIG. 8D illustrates that if a control transfer identifier contains a single partition id (e.g., the partition identifier D 848 of the task 810), a corresponding, single plug-point task (i.e., 862) is inserted between that task and its outgoing node. If a control transfer identifier contains multiple partition ids (e.g., the partition identifier B,C 846 of the task 804) then plug-point tasks may be inserted in either a sequential or a fork (parallel) structure (e.g., in a sequential structure of plug-point tasks 854 and 858 of FIG. 8D).

Figure 8E:
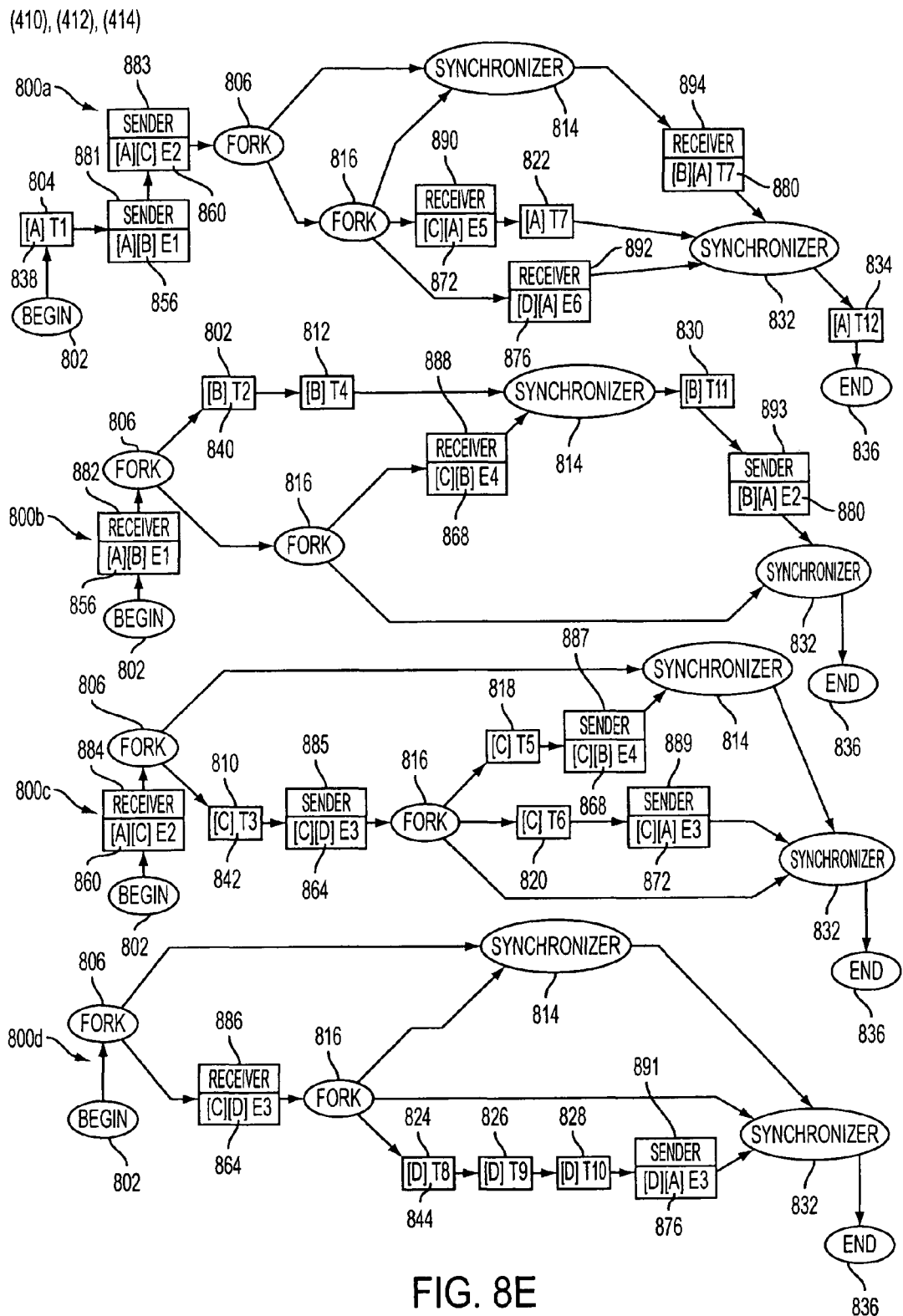
Figure 9:
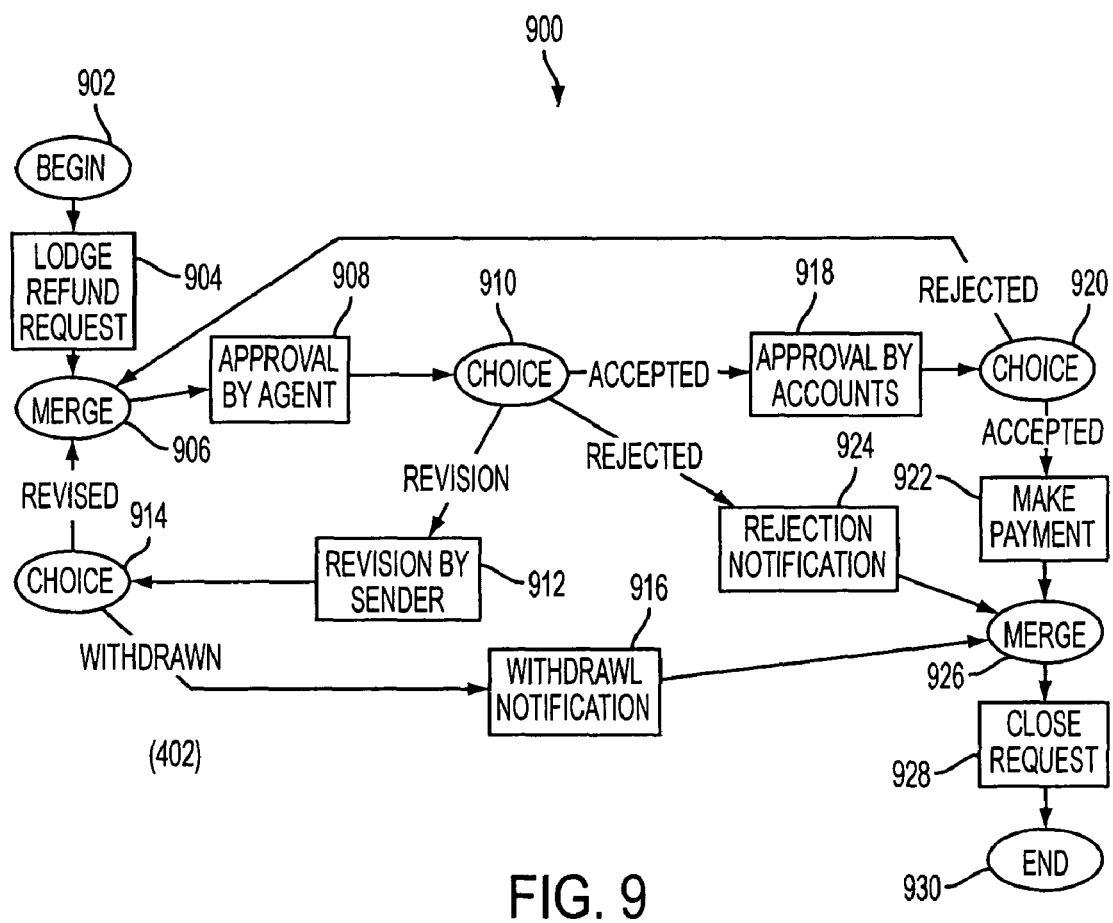
FIGS. 9-14 are block diagrams of generic process models and tasks used to illustrate a fourth example of the process of FIG. 4.

In FIG. 8E, four distributed process models 800a, 800b, 800c, and 800d are extracted to correspond to the partitions A 838, B 840, C 842, and D 842, respectively. Then, tasks that do not belong to a particular one of the partitions are removed from the process models. Thus, for example, the process model 800a contains only tasks assigned to the partition identifier A 838, along with event ids that are associated (in either a sender or receiver capacity) with the partition identifier A 838, and coordinator events (such as the fork and synchronizer events 806, 814, 816, and 832).

As described above with respect to FIG. 7E, each of the plug-point tasks 854, 858, 862, 866, 870, 874, and 878 are converted into two event coordinator tasks, i.e., sender and receiver tasks. For example, the plug-point task 854 is duplicated and/or otherwise converted to sender task 881 and receiver tasks 882, each associated with the event id E1 856. Similarly, the plug-point tasks 858, 862, 866, 870, 874, and 878 are converted into sender/receiver tasks 883/884, 885/886, 887/888, 889/890, 891/892, and 893/894, respectively.

The determination of which plug-point task becomes a sender coordinator, and which becomes a receiver coordinator, is determined by the control flow direction. For example, since the control is transferring from the partition A 838 (at the task 804) to both the partition B 840 (at the task 808) and the partition C 842 (at the task 810), the plug-points 854 and 856 are converted to the sender activities 881 and 883, respectively, in the distributed process model 800*a*, and to the receiver activities 882 and 884 in the distributed process models 800*b* and 800*c*, respectively. In this way, distributed process models 800*a*-800*d* are readied to be deployed in the process execution engine 108, and/or in other process execution engines.

FIGS. 9-14 are block diagrams of generic process models and tasks used to illustrate a fourth example of the process 400 of FIG. 4, with reference again to elements of FIG. 4. In FIGS. 9-14, partition and distribution of an integrated process model 900 (402) are determined for a refund request that may be made by a customer who wishes to return a previously-purchased item.

The integrated process model 900 includes tasks 902-928. Specifically, after an initiation or "begin" task 902, the refund request is lodged at a task 904. The workflow initially passes through a merge coordinator 906 for an agent approval task 908, which leads to a choice coordinator 910.

The choice coordinator 910 allows for several choices by the agent (which may represent, for example, a human agent, a software agent, or some combination of the two). If the request is deemed to be potentially acceptable, but in need of revision, then this is indicated by a revision by sender task 912. A choice coordinator 914 allows for a decision as to whether such a revision will be made; if so, the revised request is merged at the merge coordinator 906 with the original refund request, and passed back for further approval decision(s) by the agent. Otherwise, the refund request may be withdrawn at a task 916.

If the request is approved at the choice coordinator 910, then the request is passed for further approval to an accounts department, at a second approval task 918. The workflow thus leads to a choice coordinator 920, which may accept or reject the request. If rejected, the request is passed back to the merge coordinator 906, perhaps with an area of revision identified for review by the agent. If accepted, then payment (i.e., the refund to the customer) may be made at a task 922.

If agent rejection occurs at the choice 910, then a rejection may be sent at the rejection notification task 924. Ultimately, one or more of the above-described possible outcomes are merged at a merge coordinator 926, so that the request workflow may be closed at a close request task 928, and the process ended at an end task 930.

Figure 10:
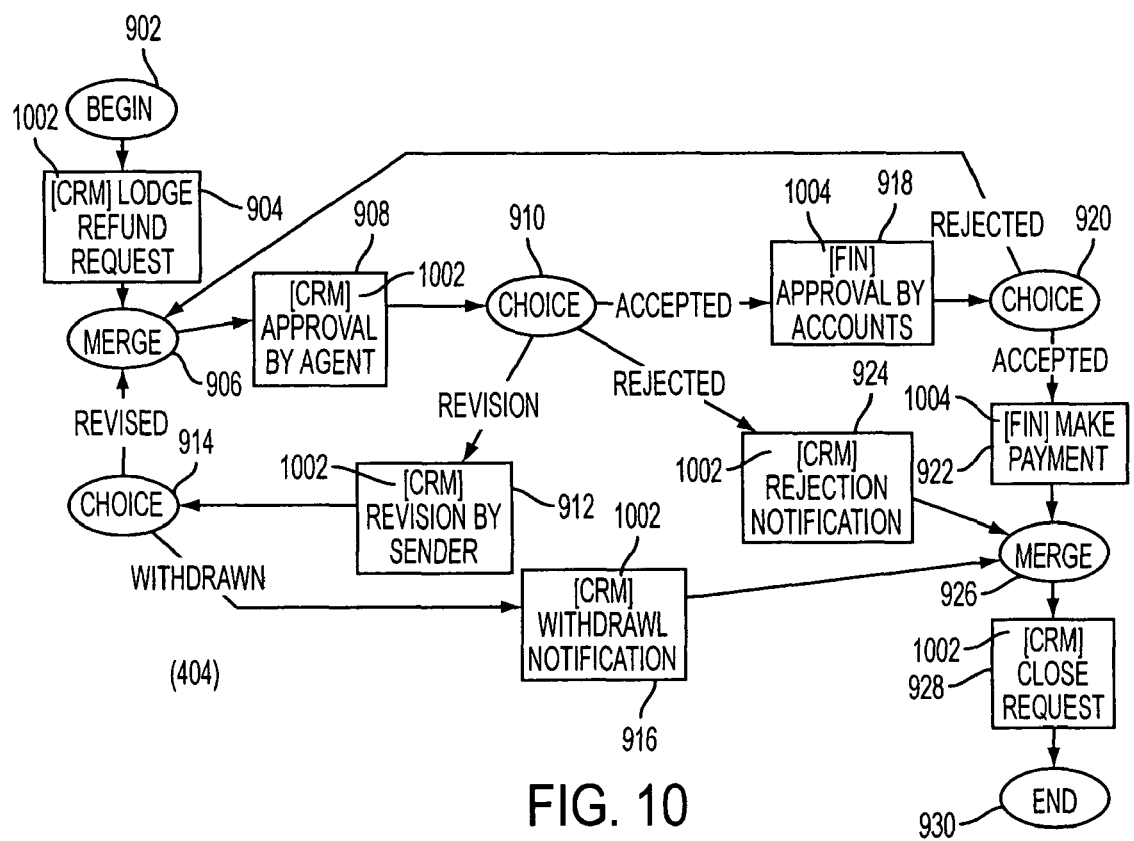

Two departments or systems are assumed to be involved: Customer Relationship Management (CRM) and Finance (FIN). As such, and as shown in FIG. 10, a partition identifier CRM 1002 and a partition identifier FIN 1004 are assigned to each of the tasks 904, 908, 912, 916, 918, 920, 922, 924, and 928 (404).

Figure 11:
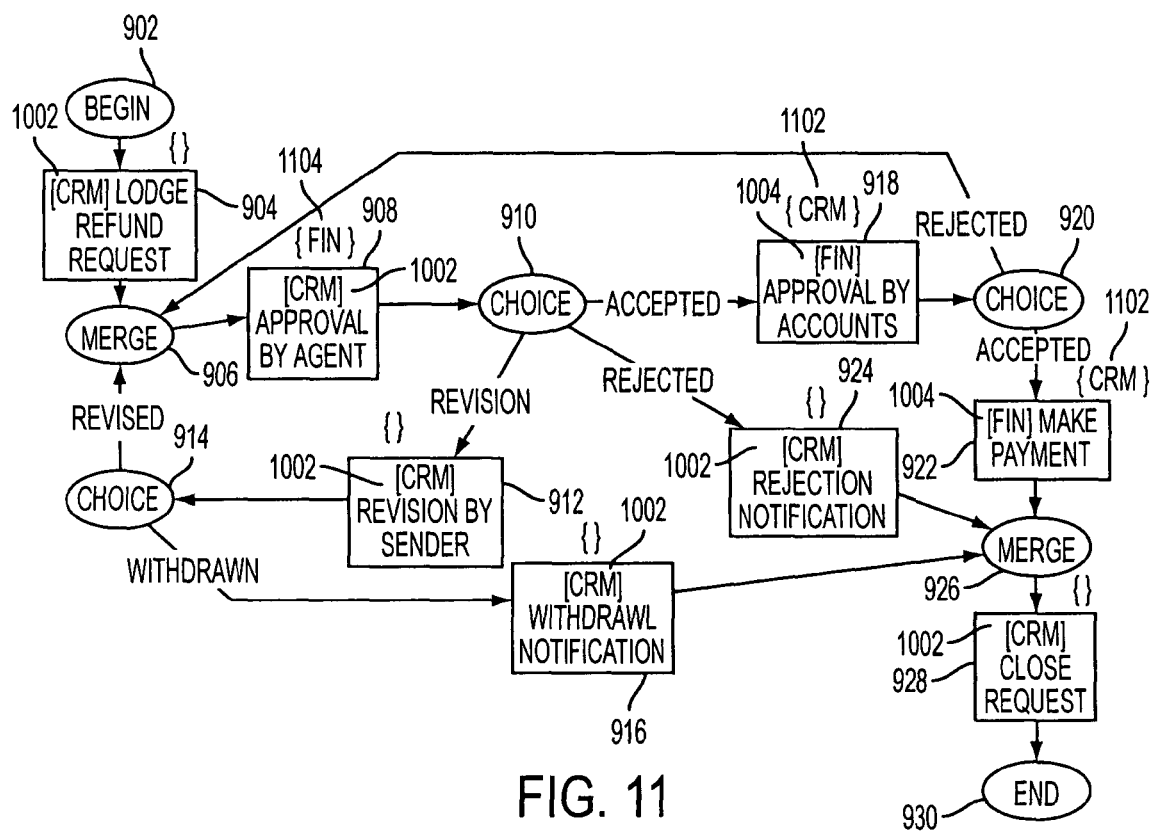

In FIG. 11, control transfer points are determined, and appropriate identifiers assigned (404). That is, by traversing a path of the directed graph of the integrated process model 900, tasks after which control transfers from CRM 1002 to FIN 1004, or vice-versa, may be determined (406). For example, after the tasks 918 and 922, control may transfer from FIN 1004 to CRM 1002, so that a control transfer identifier CRM 1102 is assigned to the tasks 918 and 922. Similarly, after the task 908, control may transfer to FIN 1004 if the request is approved and the task 918 commences. As a result, a control transfer identifier FIN 1104 is assigned to the task 908. For all other tasks 904, 912, 916, 924, and 928, control does not transfer, so that these tasks are assigned an empty set, as shown.

Figure 12:
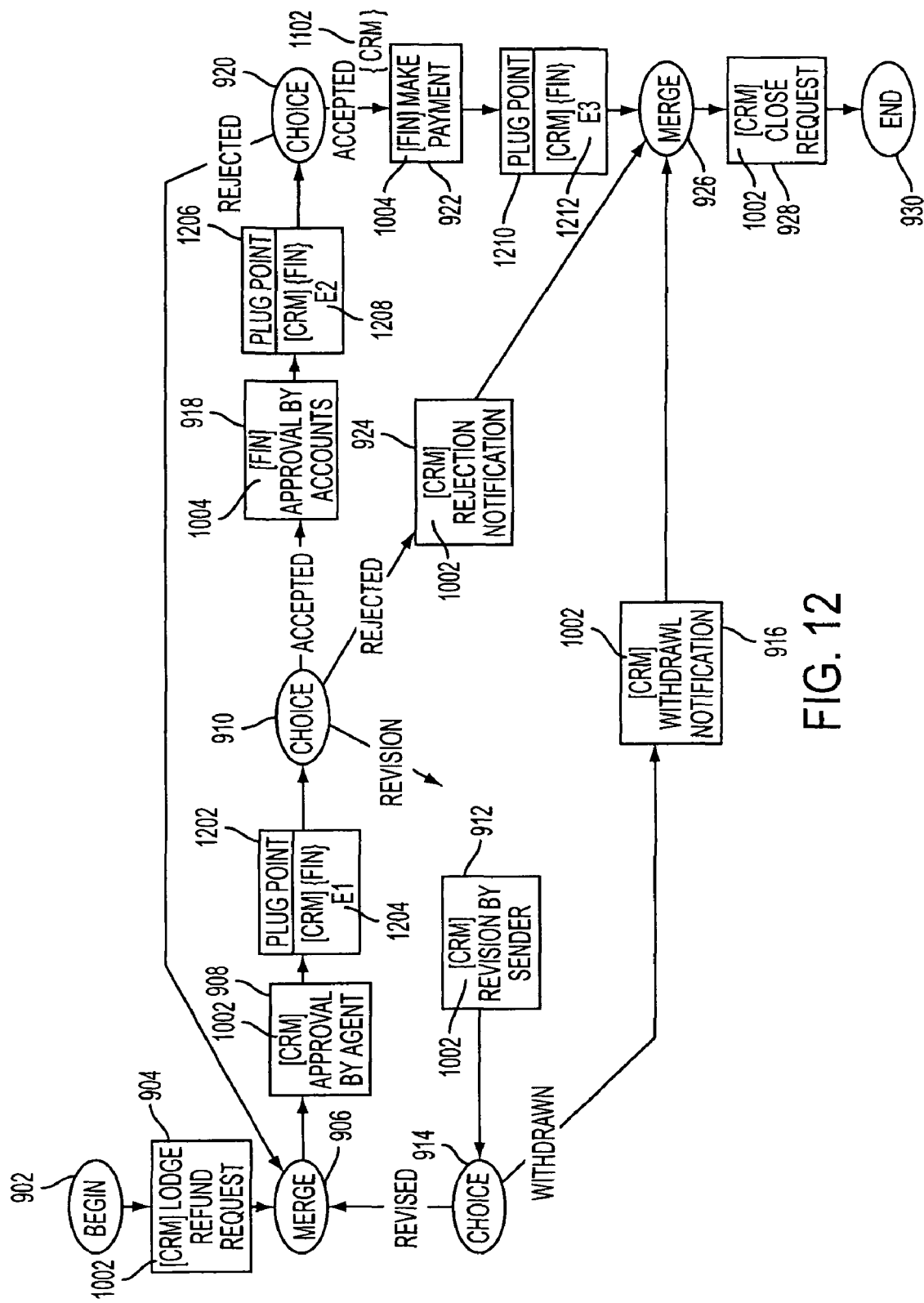

In FIG. 12, each control transfer identifier is associated with a plug-point task and an associated event id (408). For example, the control transfer identifier CRM 1002 associated with the task 908, after which control is transferred to FIN 1004, is assigned a plug-point task 1202, with an associated event id E1 1204. Similarly, plug-point tasks 1206 and 1210 are inserted with associated event ids E2 1208 and E3 1212, respectively.

Figure 13:
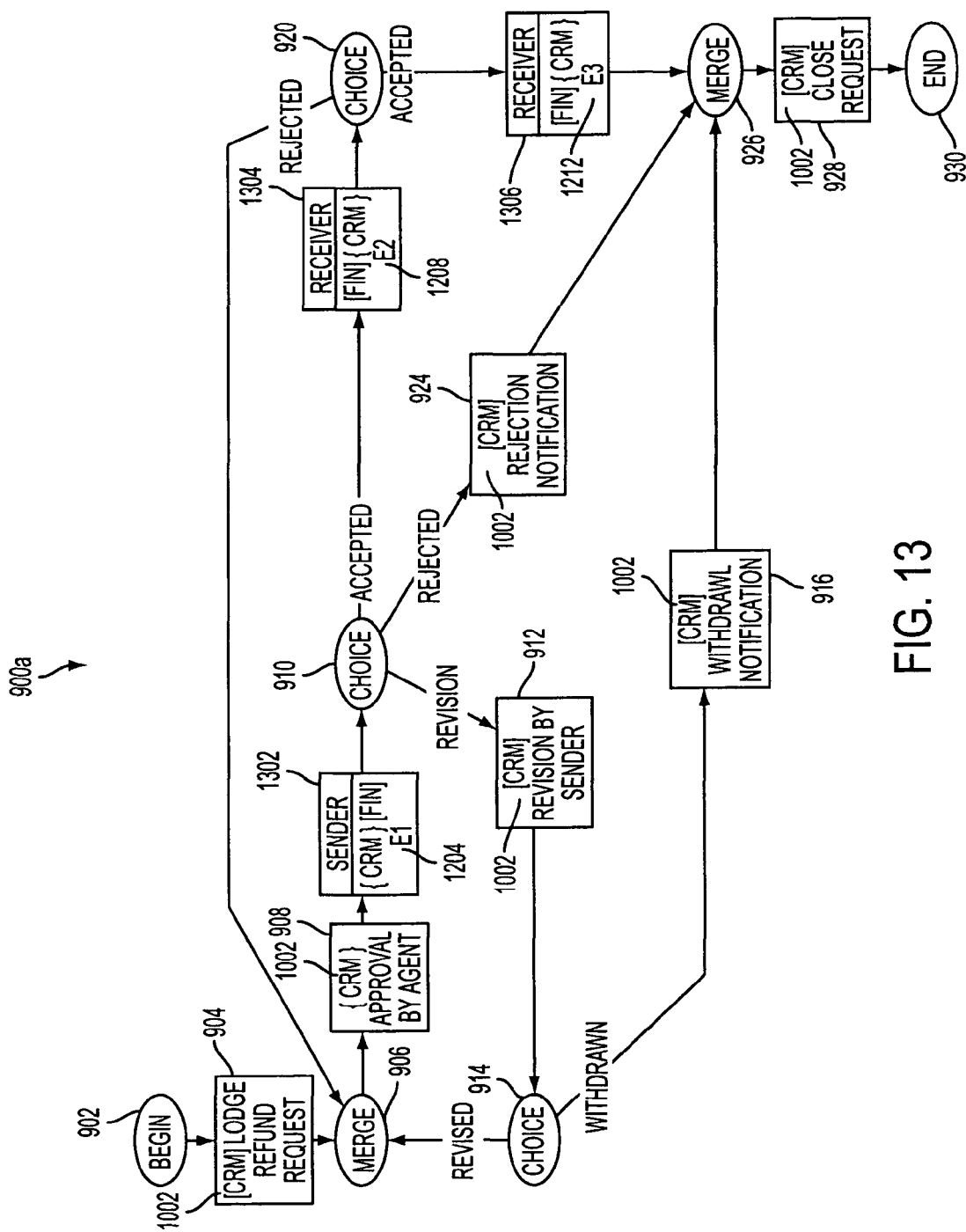
Figure 14:
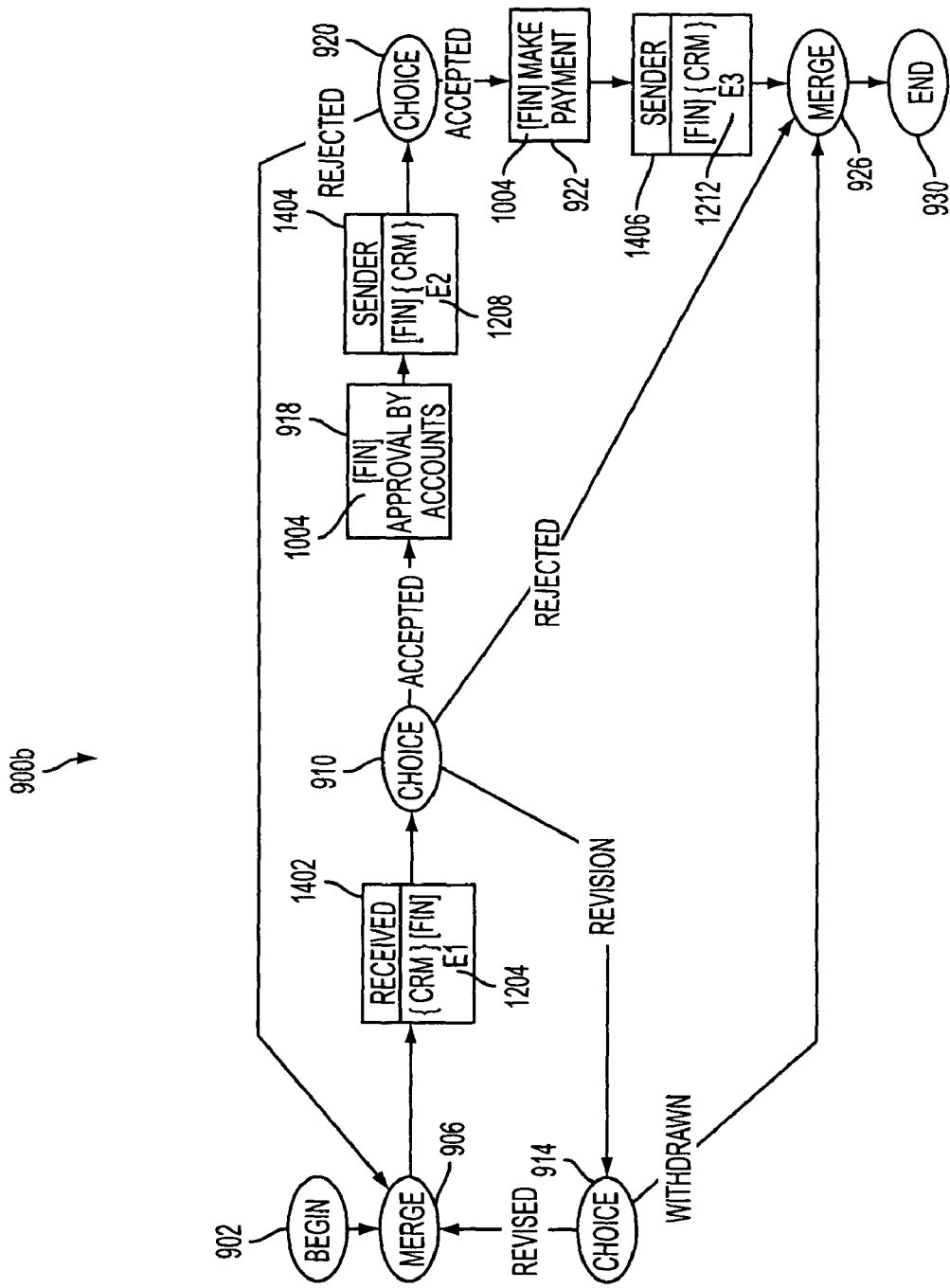

In FIGS. 13 and 14, distributed process models 900*a* and 900*b* are extracted, event flow transitions (sender/receiver tasks) are inserted, and the distributed process models 900*a* and 900*b* are deployed for execution (410, 412, and 414). Specifically, the plug-point task 1202 is duplicated and assigned to each of the distributed process models 900*a* and 900*b*. Based on a direction of the control flow of the process model 900, the first of these duplicate plug-point tasks is transformed into a sender task 1302, while the second is transformed into a receiver task 1402, each still associated with the event id E1 1204. Similarly, sender/receiver task pairs 1404/1304 and 1406/1306 are created, associated with event ids E1 1208 and E2 1212, respectively.

FIGS. 15-21 are screenshots of an interface 1500 used with the process modeling tool of FIGS. 1 and 3, and/or illustrating a fifth example of the process 400 of FIG. 4. FIGS. 15-21, and, in particular, FIGS. 15, 16, and 19-21 are primarily intended to illustrate examples and features of the interface 1500, as well as to provide more detailed examples of possible implementations for coding of the interface 1500 and associated functionality. As such, and since numerous examples are provided above with respect to methodologies for obtaining distributed process models from an integrated process model, the following discussion of FIGS. 15-21 does not necessarily include detailed analysis of each of the illustrated tasks and/or operations, except as otherwise indicated.

Figure 15:
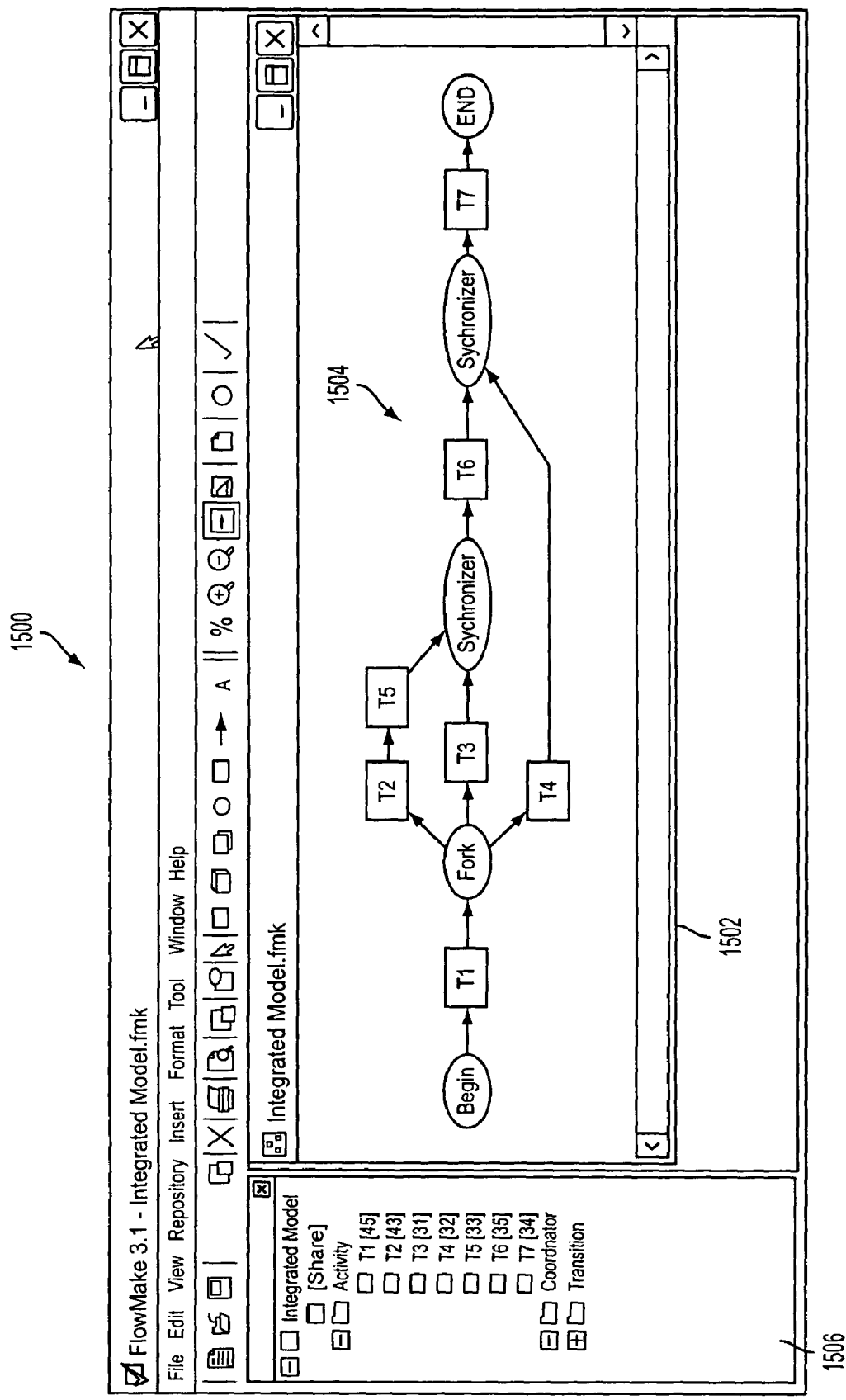
FIGS. 15-21 are screenshots of an interface used with the process modeling tool of FIGS. 1 and 3, and/or illustrating a fifth example of the process of FIG. 4.

In FIG. 15, then, the interface 1500 includes a first window 1502 for displaying an integrated process model 1504, and a second window 1506 for displaying hierarchical and other information about the integrated process model 1504. A user may thus model, construct, and view the integrated process model 1504, in a manner that is straight-forward and subject to existing standards and techniques for analyzing, validating, verifying, and optimizing process models, particularly since all inter-dependencies are modeled at the same level. Moreover, the integrated process model 1504 may be designed based on overall process execution requirements and inter-dependencies of process tasks, and without taking into account any potential distribution requirements. The process designer may design the process model 1504 as if the process model 1504 will be executed as a single process instance, on a single process execution engine.

Figure 16:
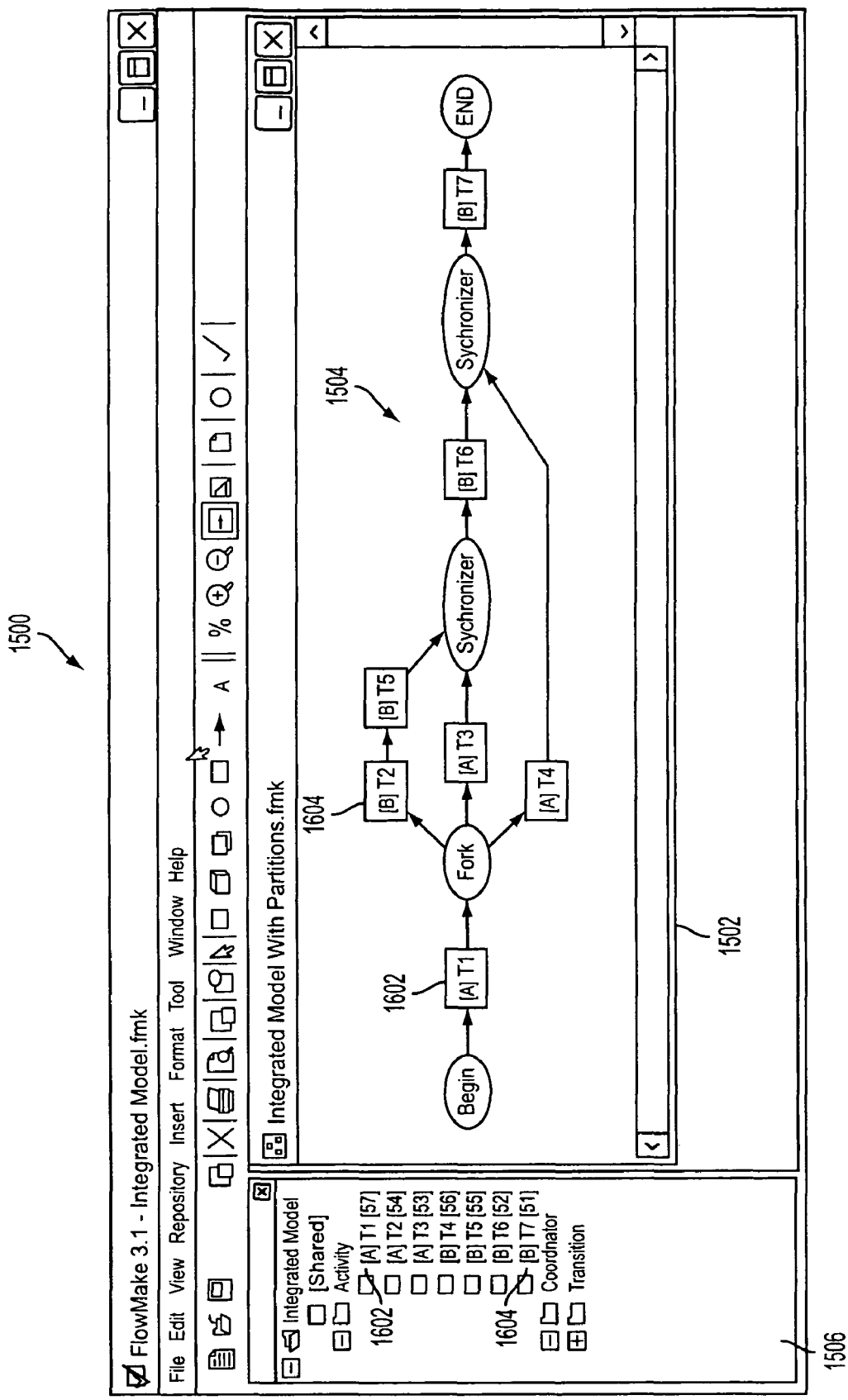

In FIG. 16, the user assigns one of two partition identifiers A 1602 or B 1604 to each of the (non-coordinator) tasks of the integrated process model 1504. As shown, information related to the partition identifiers 1602 and 1604 may be reflected within portions 1502 and 1506 of the screenshot 1500. As already described, the partitions 1602 and 1604 are determined by the process designer, based on distribution requirements for the process model 1504, such that each of these partitions will ultimately relate to a distributed process model to be extracted from the integrated process model 1504. Thus, the tasks in the process model 1504 represent the execution objects for achieving underlying business process objectives. The process designer associates a partition id with each task in the process model to specify the distribution requirements for the process distribution algorithm(s), discussed in more detail below, and which are designed, as should be understood from the above examples and discussion, to ensure that none of the control flow constraints modeled in the integrated process model 1504 are compromised.

Once the process designer has identified the targeted partitions 1602 and 1604 for each of the process tasks of the integrated process model 1504, the distribution algorithm(s) may be applied, so as to identify transitions where control flow is transferred from one partition to another. As understood from the examples above, this information may then be used to insert plug-point tasks.

In the example process modeling language (PML) described above, each task is assumed to have one outgoing transition that is linked to either a coordinator node or a task node. As described, in simple sequential structures, if the target node of a control transition belongs to a different partition than its source node, then it is considered to be a control transfer transition. If both nodes belong to the same partition, then the transition belongs to the same partition and has no impact on the distribution algorithm.

In more complex cases, where target node is a coordinator, we need to traverse the process graph stopping only when we reach a task node. In this case we will may have more than one task nodes to compare with the source node of the transition in order to determine whether it is a control transfer transition.

As a result, each task node is attached with a set of partition ids consisting of partition ids of the task nodes that immediately follow it and do not belong to the same partition as itself excluding the coordinator nodes.

The following algorithm outlines the approach used to build these sets for a given process graph G:

---
Algorithm 1
---
procedure IDENTIFYTRANSFERPARITIONS(G)
    for each task node t ∈ taskNodes[G] do
        transferPartitions[t] ← { }
        for each task node pt ∈ proceedingTaskNodes[t] do
            if partitionId[pt] <> partitionId[t] then
                transferPartitions[t] ←
                      transferPartitions[t] ∪ partitionId[pt]
            end if
        end for
    end for
---

Figure 17:
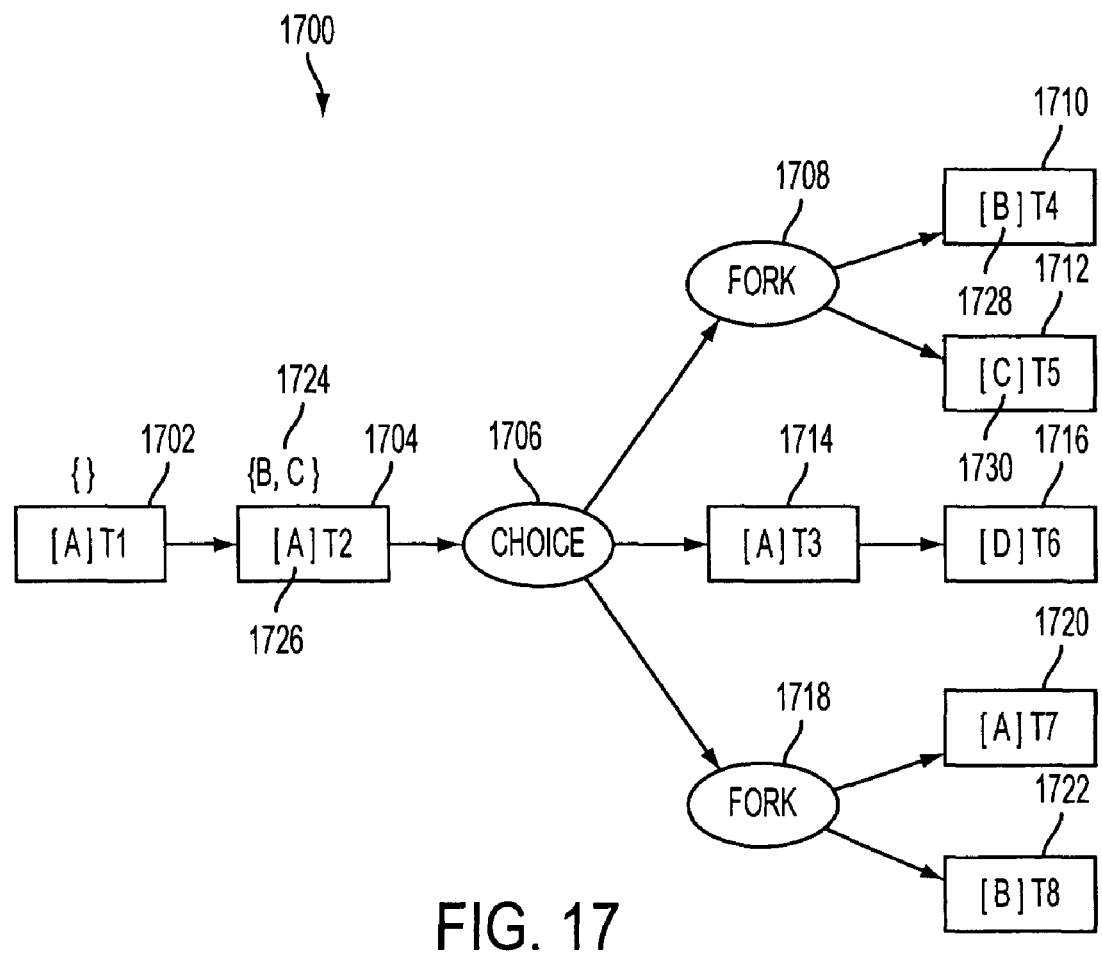
Figure 18:
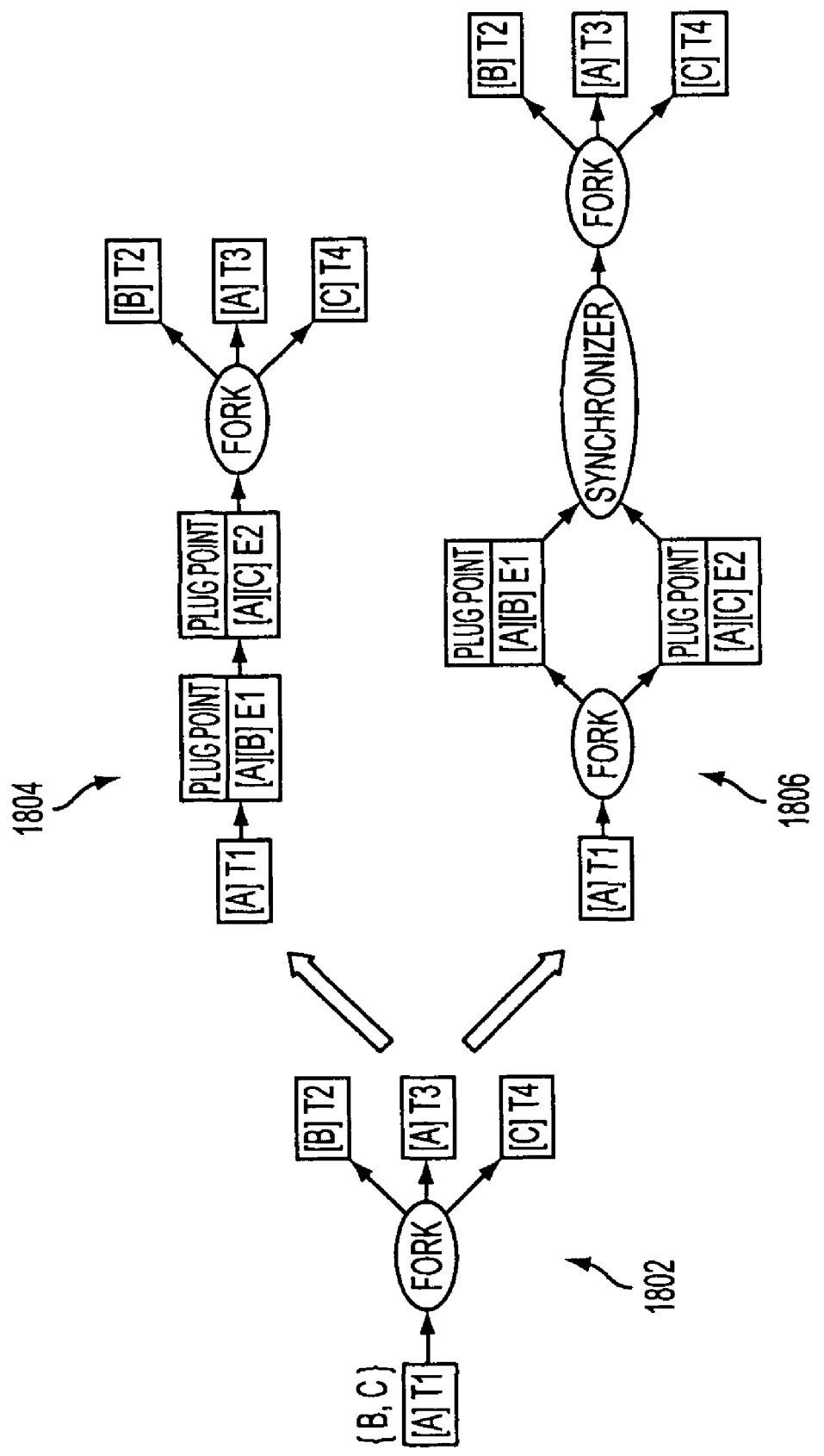

FIG. 17, for example, which illustrates a process model (graph) 1700 that may be viewed with the windows 1502 and 1506 of the interface 1500. Process model 1700 includes task and coordinator nodes 1702-1722. Specifically, tasks T1 1702 and T2 1704 illustrate a sequential and a complex example, respectively, of tasks that must be assigned control transfer identifiers.

That is, applying Algorithm 1, above, the results are:

For task node T1:

1 proceeding TaskNodes[T1]={T2}

2 partitionId[T1]=A 3 parftitionId[T2]=A 4 transferPartitions[T]={ }

For task node T2:

5 proceedingTaskNodes[T2]={T3, T4, T5, T7, T8}

6 partitionId[T2]=A 7 partitionId[T3]=A, partitionId[T4]=B, partitionId[T5]=C, partitionId[T7]=A, partitionId[T8]=B 8 transferPartitions[T2]={B, C}

Thus, as shown in FIG. 17, the task T1 1702 receives a control transfer identifier with an empty set, while the task T2 1704 receives a control transfer identifier 1724, showing transfer of control from the task T2 1704 from a partition identifier A 1726 to partition identifiers B 1728 and C 1730.

Subsequent insertion of plug-point tasks uses the resulting transferPartitions[t] sets of each of the task nodes in the process model just described in order to insert plug-point task nodes. As already described, each plug-in task node contains information about its source partition id, its target partition id, and a unique event id, and this information may be determined and assigned by the following algorithm:

---
Algorithm 2
---
procedure INSERTPLUGPOINTTASKS(G)
    for each task node t ∈ taskNodes[G] do
        for each partitionId pid ∈ transferPartitions[t] do
            insert plugPointTask ppt after task node t
                with partitionId[t] as source and pid as target
        end for
    end for
---

If the transferPartiton[t] contains a single partiton id, a plug-point task is inserted between t and the outgoing node of t. However, if transferPartiton[t] contains two or more partition ids, as shown in a process model 1802 of FIG. 18, then plug-point tasks may be inserted in either a sequential (as in a process model 1804) or a fork (parallel) structure (as in a process model 1806) after t.

Figure 19:
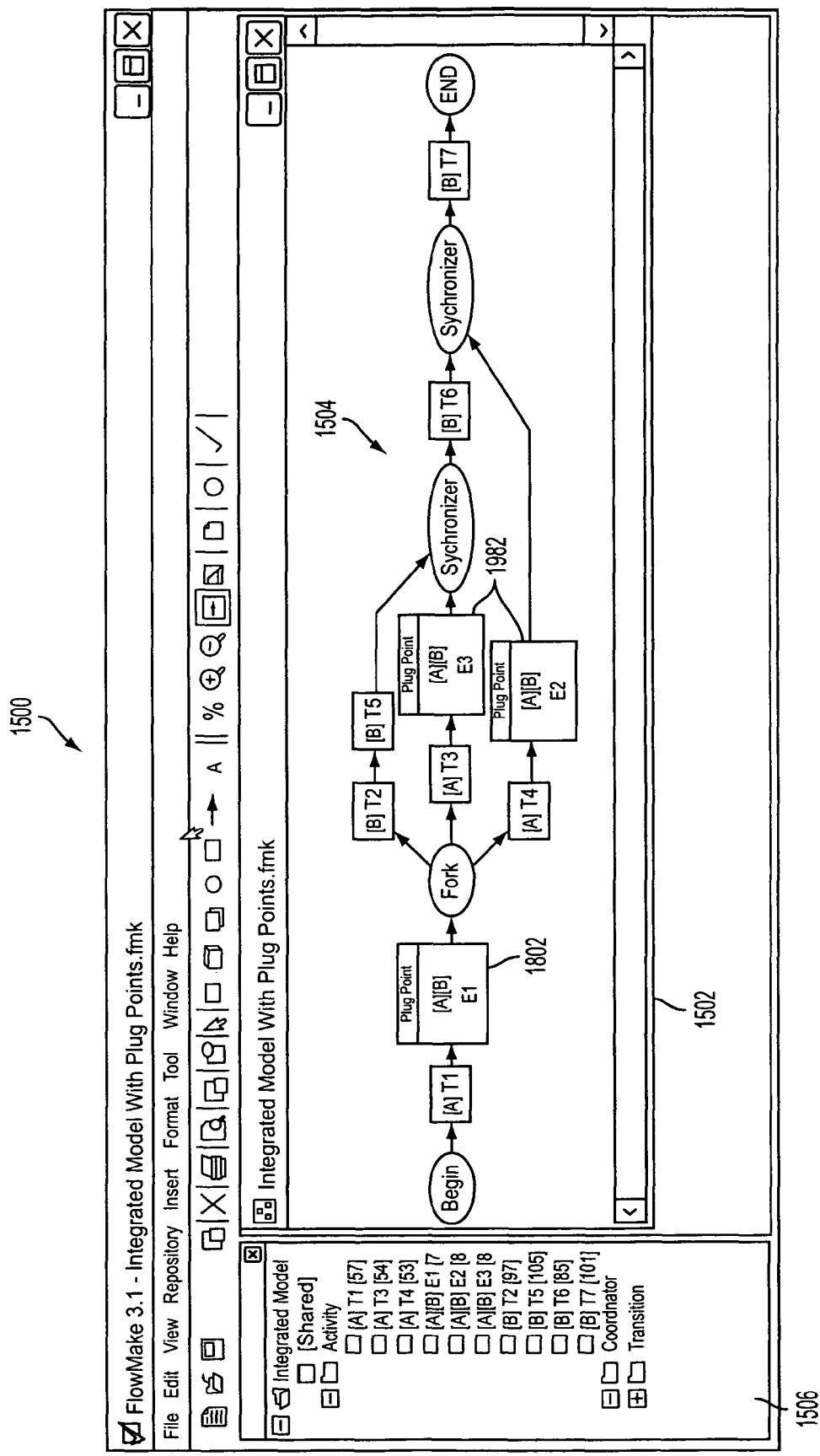
Figure 20:
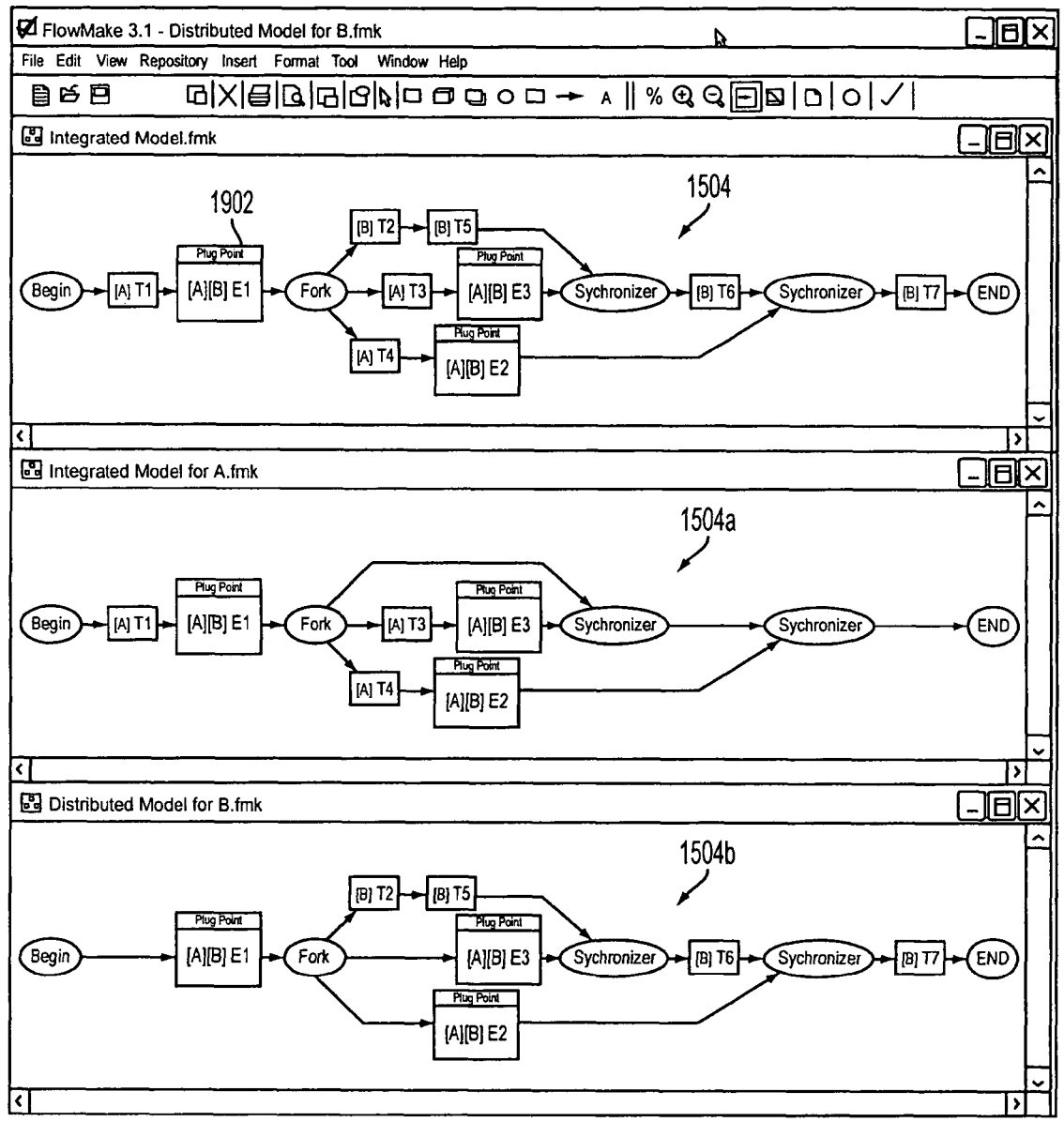

Following the above principles and applying Algorithms 1 and 2 with respect to the process model 1504 of FIGS. 15 and 16, FIG. 19 illustrates the resulting addition of plug-point tasks 1902. In FIG. 20, the process designer may then used the process modeling tool to generate distribued process models 1504a and 1504b. As shown, and as described above in detail, the algorithm below may be used to make copies of the integrated process model 1504 with plug-point tasks for each of the partition identifiers. Then, in each of the copied process models, task nodes that do not belong to the partition identifier associated with the paritcular process model are removed.

---
Algorithm 3
---
procedure EXTRACTDISTRIBUTEDPROCESSMODELS(G)
    for each partition p do
        make a copy of G as distributed process Gp for p
    end for
    for each distributed process Gp
        for each t ∈ taskNodes[Gp] do
            if partitionId[t] <> p then
                remove t
            end if
        end for
    end for
---

In FIG. 20, then, the two distributed process models 1504a and 1504b corresponding to the process designer's partition identifiers have been created, and task nodes that do not belong to respective partitions have been removed. Since the plug-point tasks 1902 belong to both partitions, they remain in both distributed processes 1504a and 1504b. Similarly, all the coordinator nodes also are maintained.

Figure 21:
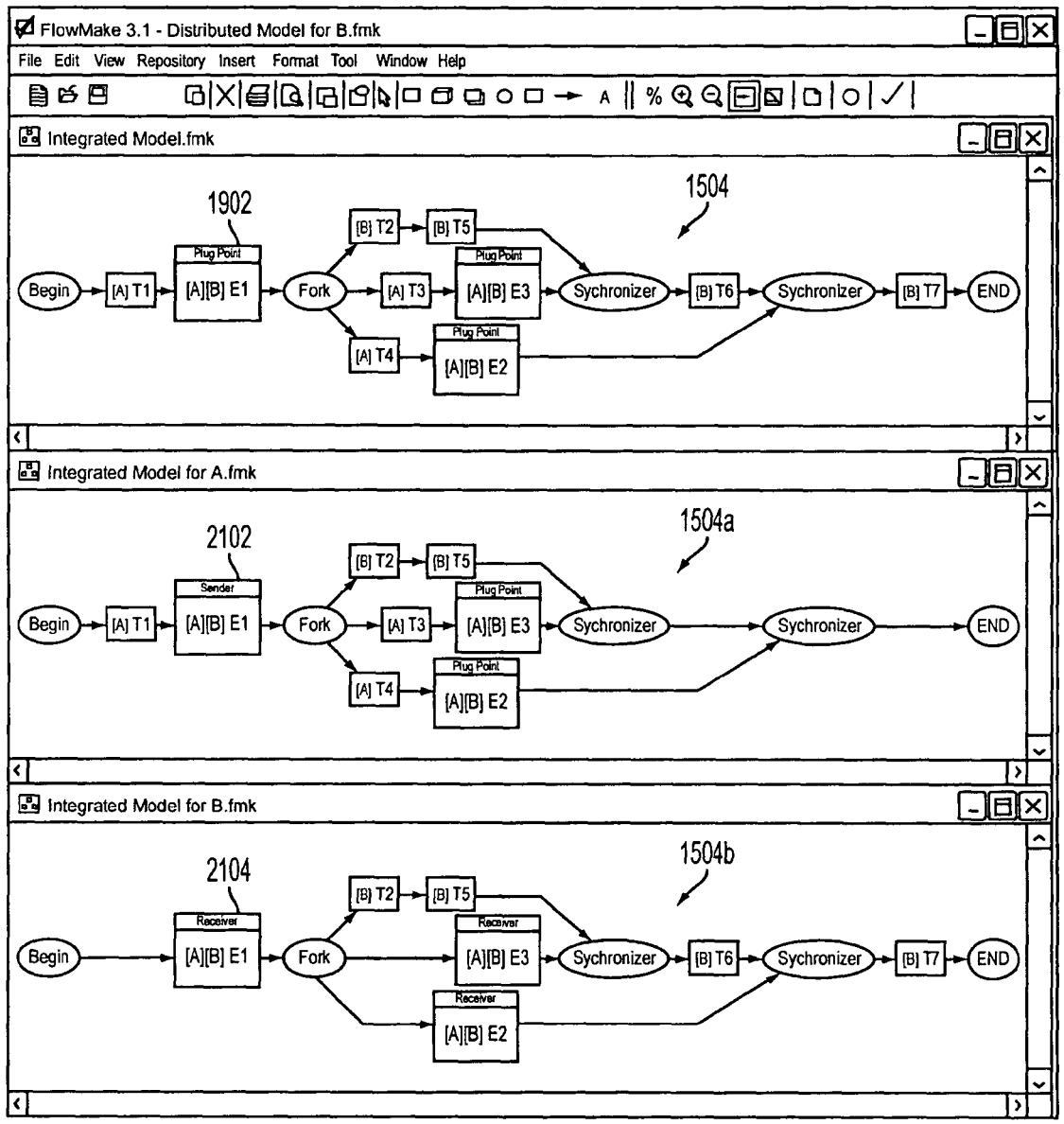

Finally in this example, in FIG. 21, the plug-point tasks 1902 are transformed into sender and receiver tasks 2102 and 2104, respectively. That is, each plug-point task node has a source partition and a target partition associated with it, representing a transfer of control from source to target at the plug-point task. If the source partition identifier is the same as the partition identifier of the process model being considered, then the plug-point task is converted to a sender task node. On the other hand, if the target partition identifier is the same as the partition identifier of the process model being considered, then the plug-point task is converted to a receiver task node. As also described, each pair of sender and receiver tasks is associated with a unique event id within the different process models 1504a and 1504b, in order to allow the process engine and messaging infrastructure to keep the distributed process model in synch with one another at run-time. An example of an Algorithm for performing this process is shown in Algorithm 4:

---

Algorithm 4

---

```
procedure TransformPlugPoints(G)
    for each distributed process Gp
        for each t ∈ taskNodes[Gp] do
            if taskType[t] = PLUG-POINT
                if sourcePartitionId[t] =
                partitionId[Gp] then
                    taskType[t] ←SENDER
                else if targetPartitionId[t] =
                partitionId[Gp] then
                    taskType[t] ←RECEIVER
                end if
            end if
        end for
    end for
```

---

Subsequently, the process models 1504a and 1504b may be deployed to one or more process execution engines, and executed. As described, the modeling and maintenance of the various process models does not depend on which process execution engines ultimately are used. Further, the distributed process models 1504a and 1504b are extracted from the integrated process model 1500 automatically, with minimal involvement of the process designer, and may be executed independently of, but synchronized with, one another.

In addition to allowing ease of design and verification of an integrated process model before distribution occurs, the above-described implementations allow use of an integrated process model for global monitoring and visualization, while the distributed process models are used for local execution and visualization.

Although the above examples are discussed in terms of assigned partitions and distributions, it should be understood that the process designer has the further capability of changing previously-assigned partitions, according, for example, to changing business needs, and use the process modeling tool 102a to create modified distributed process models. Various other features and examples may be implemented.

The above examples discuss situations in which a process designer begins with a single process model, and seeks to fragment the process model for distributed execution, while maintaining the integrity and result of the original process model. In some cases, however, the process designer will be required to begin with multiple process models. For example, the designer may be presented with a situation in which multiple business partners wish to, or are required to, use their own, already-formed, process models. In this case, the process designer may wish to merge the existing process models into an integrated process model. The process designer may then execute the integrated process model, or may use the integrated process model for high-level visualization and monitoring, or may use the techniques described above to obtain distributed process models. In the last case, the distributed process models may be different from the original process models, but will still achieve the same result at the integrated process model that incorporates the original process models.

Figure 22:
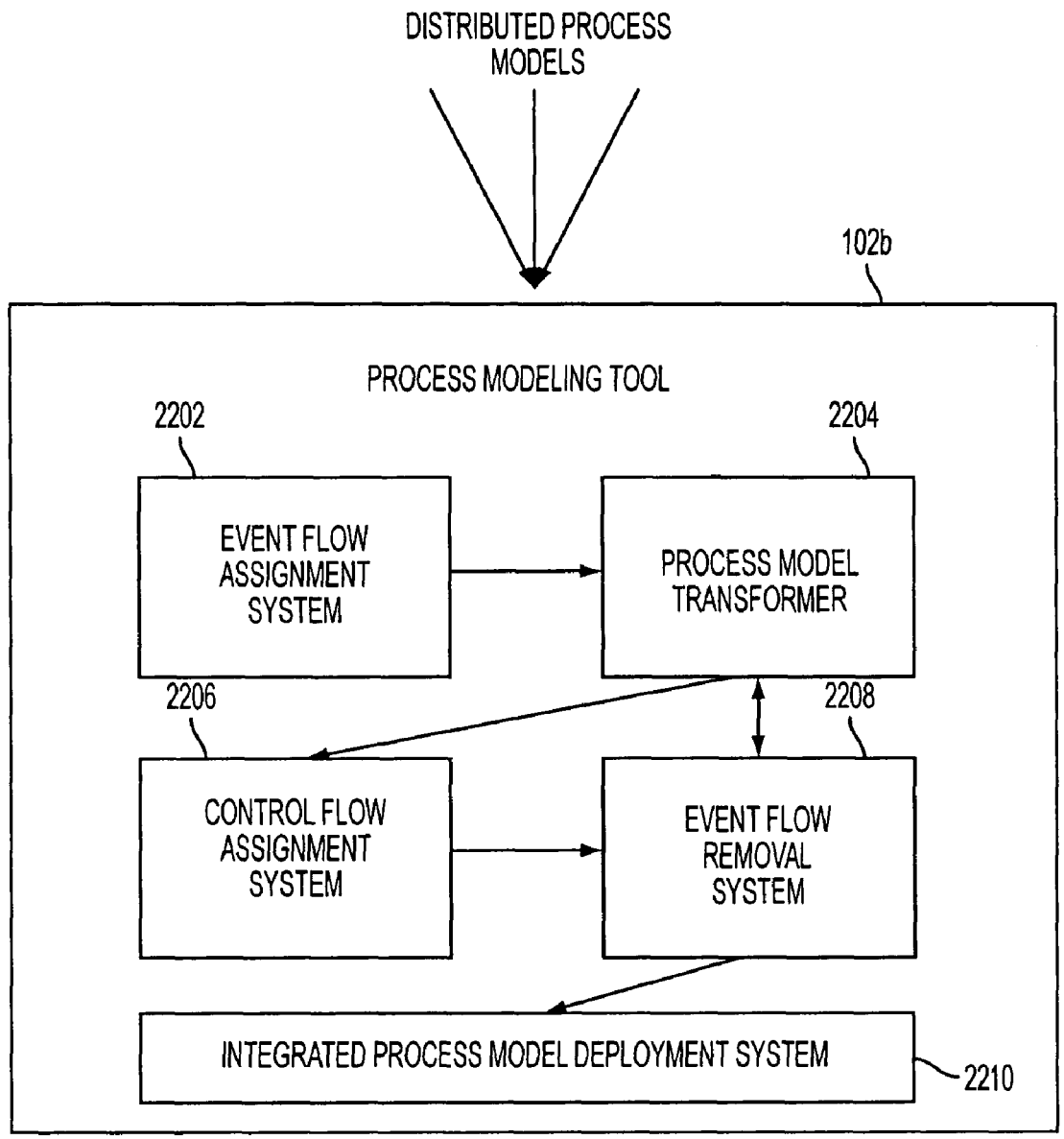
FIG. 22 is a block diagram of a second implementation of the process modeling tool of FIG. 1 that is operable to perform automated integration of distributed process models.
Figure 23:
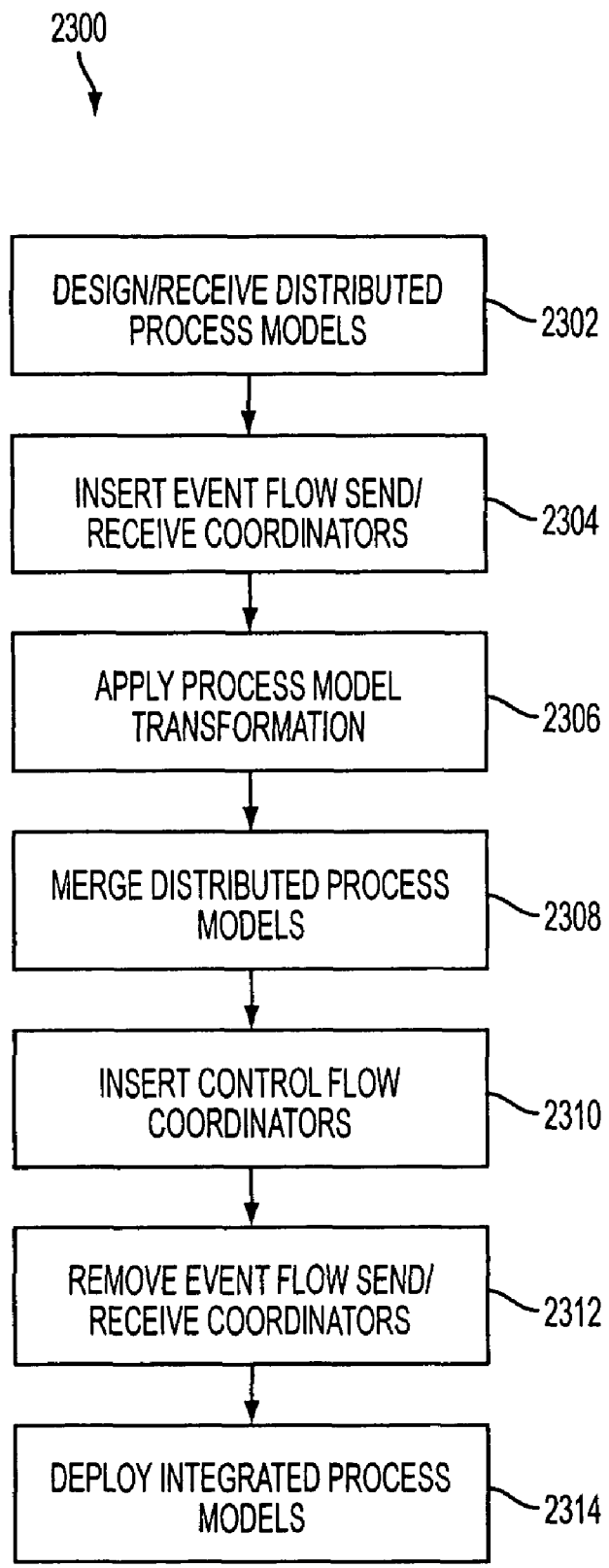
FIG. 23 is a flowchart illustrating an operation of the process modeling tool of FIG. 22.

FIG. 22 is a block diagram of a second implementation of the process modeling tool 102 of FIG. 1 that is operable to perform automated integration of distributed process models. FIG. 23 is a flowchart illustrating an operation of the process modeling tool of FIG. 22.

Specifically, in FIG. 22, a process modeling tool 102b is illustrated that is designed to receive a plurality of distributed process models that have been obtained, and to integrate these distributed process models for output as an integrated process model.

Thus, and with reference to FIG. 1 as well as FIGS. 22 and 23, the designer 104 inputs two or more distributed process models (2302). The process models may be created by the designer 104, or one or more of the distributed process models may be obtained from a separate source, such as, for example, a business partner.

An event flow assignment system 2202 is used to assign a desired event flow, e.g., using sender/receiver tasks as described above, so as to coordinate task flow between the distributed process models (2304). A process model transformer 2204 is used to refine and simplify the individual distributed process models (which now include the sender/receiver tasks) (2306). That is, the process model transformer 2204 may be used, for example, to replace certain process modeling constructions with execution-equivalent structure. For example, certain fork/synchronizer structures may be determined to be redundant, or parallel processes may be transformed to sequence flows.

The process to this point may be considered a technique for modeling event-driven, distributed process models that uses sender and receiver event flow activities to ensure synchronization of the distributed processes at run-time. Such processes, by themselves, may be useful in managing certain types of workflows. For example, simpler workflows that do not require extensive verification and validation may be implemented by these distributed processes.

Hereafter, as described below, the distributed processes are actually merged into a single, integrated process model. As such, the resulting integrated process model enables the use of existing tools for verification and validation. Further, the integrated process model enables model-wide viewing and monitoring of all tasks, as well as a centralized location for modification of the process.

In other words, the transformed, distributed process models may be merged into a single process flow (2308), and re-assigned from having event-flow transitions between the process models to having control flow assigned for establishment of intra-process model operation, using a control flow assignment system 2206 (2310). Then, the event flow nodes are removed, using an event flow removal system 2208 (2312). Finally, an integrated process model deployment system 2210 verifies and validates the resulting integrated process model, and outputs the integrated process model for execution on the enactment engine 108, and/or for viewing on the monitoring system 112 (2314).

FIGS. 22 and 23 thus present a modeling tool, and system and method, for merging event-driven distributed process models into a single process model definition. As described in more detail below, algorithms may be used to support automatic linking of the distributed process models into an integrated process model, and for applying reduction principles so as to refine the integrated model. Using these techniques, the capability may be provided to conceptually analyze and verify the integrated/merged process model for correctness, using techniques available for integrated process models but not generally available for distributed process models.

Further, the capability may be provided to automatically merge two or more process models that were previously being executed independently, as a new, single, integrated process model to be executed as a single instance in a single process engine. Still further, the merged process model may then be used for process monitoring and visualization that can span across more than one distributed process model. As a final example, functionality may be provided for arbitrary selection of a sub-set of process models involved in a distributed process management environment to replace event flow with control flow for effective analysis of control flow dependencies within that sub-set.

The approach is applicable in many scenarios. As one example, in a business-to-business process integration, each partner may want to execute their own part of the collaborative business process in their own business process execution environment. However, all partners may want to define integrated collaborative process model together, for global analysis and visualization. In this case, the partners may use the approach described herein to merge their distributed process models into a common process model.

Then, during the course of collaboration, the partners may want to change the responsibilities and allocation of process activities from one partner to another. In this case, the integrated process model would be re-created, using the updated distributed process models. Process model changes, such as, for example, adding new tasks or removing existing tasks, also may be introduced at the distributed process model level, so that an impact of such changes may be effectively analyzed at the integrated process model level.

As discussed above, ensuring the correctness of business processes may be problematic. Existing approaches tend to be most useful to verify, validate, and optimize business processes with respect to integrated process models. The process designer would make use of the modeling tool 102b to analyze, verify, refine, and improve the integrated process models created from the existing distributed process models, using the merging approach presented herein.

Figure 24A:
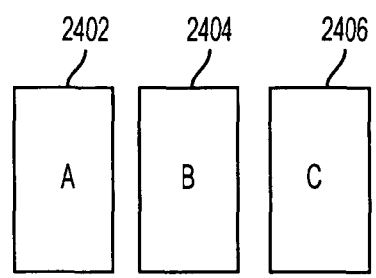
FIGS. 24A-24E are block diagrams of generic process models and tasks used to illustrate a first example of the process of FIG. 2300.

FIGS. 24A-24E are block diagrams of generic process models and tasks used to illustrate a first example of the process 2300 of FIG. 2300. In FIG. 24A, three distributed process models 2402, 2404, and 2406 are present (2302). The process models 2402, 2404, and 2406 are independent of one another, and may be deployed and/or executed separately from one another. Each of the distributed process models 2402, 2404, and 2406 is associated with a designated participant, and includes tasks that are relevant for the participant to whom the particular process model belongs.

Figure 24B:
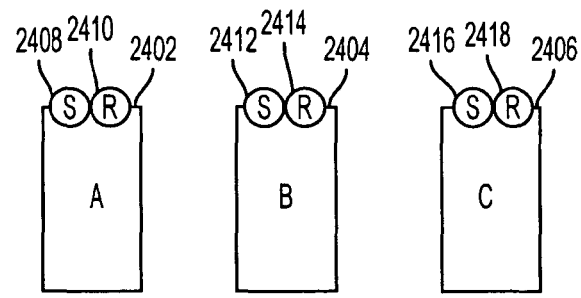

In FIG. 24B, pairs of sender/receiver tasks 2408/2410, 2412/2414, and 2416/2418 are inserted at each of the three process models 2402, 2404, and 2406, respectively, in order to introduce an intended event flow between the distributed process models 2402, 2404, and 2406 (2304). That is, the event flow is designated that implements a desired flow of responsibility between each of the partners that is respectively associated with the process models 2042, 2404, and 2406. Although not shown in detail in the simple example of FIGS. 24A-24E, the process models and event flows of FIG. 24B may be simplified through the use of process model transformation and reduction algorithm(s), so as to, for example, remove redundant structures and/or simplify complex structures.

At this point, modeling of the three process models 2402, 2404, and 2406 is completed such that the process models 2402, 2404, and 2406 are ready for independent deployment of one another, such that, at runtime, they may execute in synchronization with one another (using the sender and receiver event flow activities 2408-2418). This modeling process for defining event-driven distributed process models that use sender and receiver event flow activities to keep the distributed processes in synchronization at runtime may be applied, regardless of whether the following merging process is implemented in a particular situation.

Figure 24C:
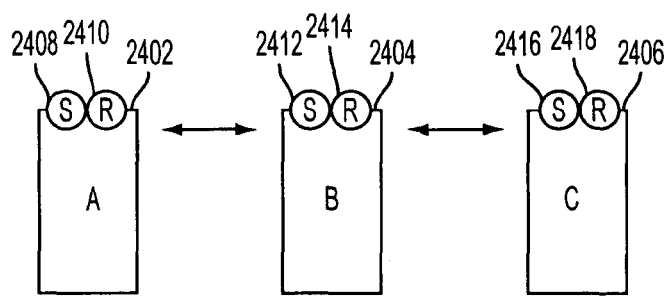

In FIG. 24C, the process models 2402, 2404, and 2406 are merged into a single process model. That is, for example, the process models 2402, 2404, and 2406 are suitable for execution on a single workflow enactment engine.

Figure 24D:
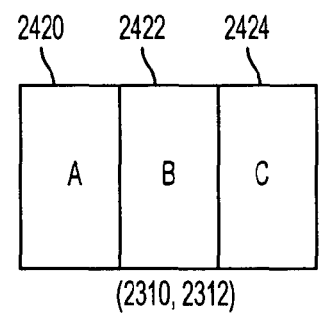
Figure 24E:
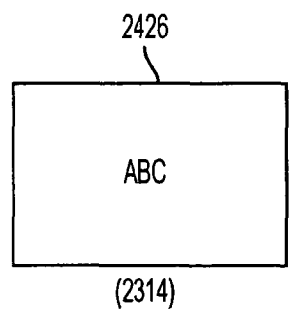

In FIG. 24D, the sender and receiver event flow activities 2408-2418 are removed/replaced with corresponding fork and synchronizer coordinators. That is, event flow activities are replaced with control flow activities. Here, the corresponding fork and synchronizer coordinators are linked to one other, and an integrated process model having portions 2420, 2422, and 2424 results. As such, in FIG. 24E, a merged process model 2426 results that is subject to verification and validation, useful as a visualization tool, or able to be deployed/enacted in a workflow enactment engine.

Figure 25A:
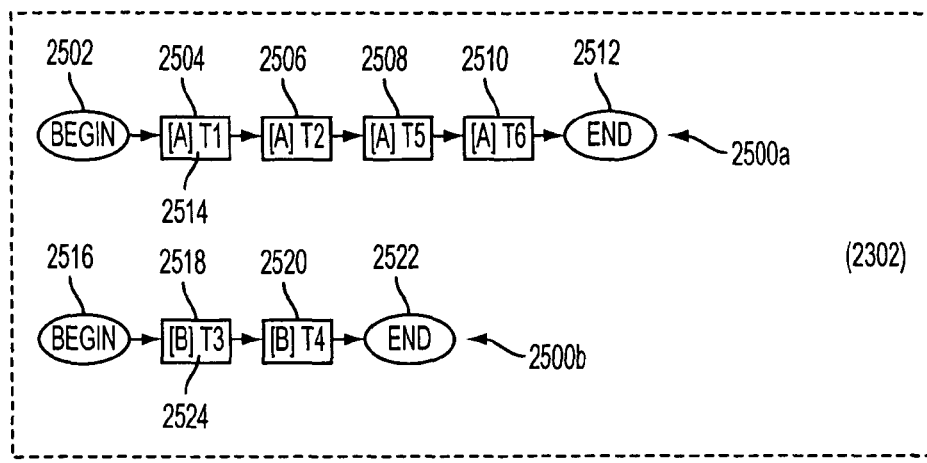
FIGS. 25A-25D are block diagrams illustrating a second example of the process of FIG. 23 for an integration of distributed process models.

FIGS. 25A-25D are block diagrams illustrating a second example of the process of FIG. 23 for an integration of distributed process models. As shown, distributed process models 2500a and 2500b of FIG. 25A are merged into an integrated process model 2500 of FIG. 25D.

In FIG. 25A, then, a first distributed process model 2500a includes tasks 2502-2512, all of which are associated with an entity A 2514 for performing the tasks 2502-2512. A second distributed process model 2500b includes tasks 2516-2522, associated with an entity 2524.

Figure 25B:
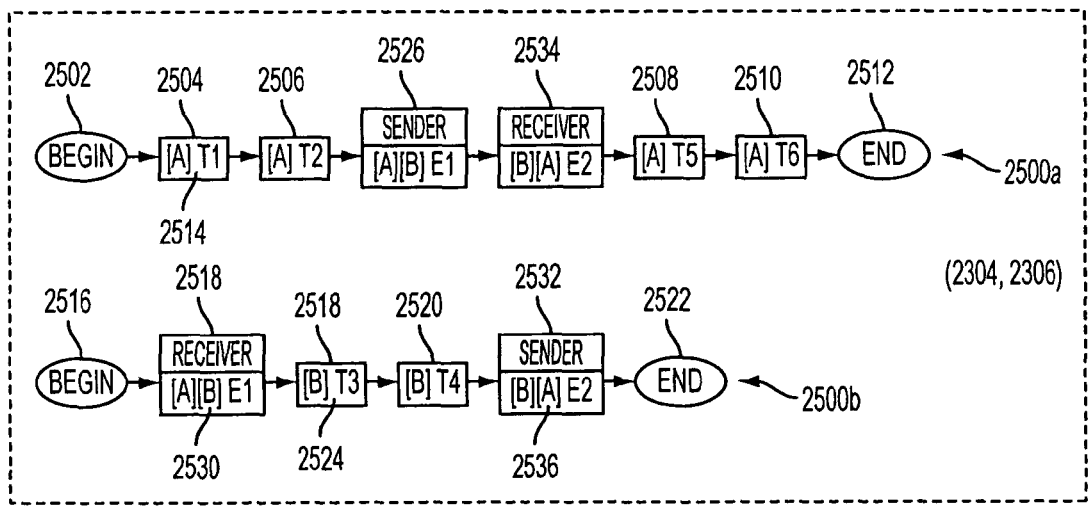

In FIG. 25B, a first sender/receiver pair 2526/2528 is associated with an event identifier E1 2530, while a second sender/receiver pair 2532/2534 is associated with a second event identifier E2 2536. At this point, the distributed process models 2500a and 2500b may be run as an event-driven workflow, even though the models have not (yet) been merged into an integrated process model. That is, the installed event flow captures the interdependencies between the two models 2500a and 2500b, and ensures, for example, that task 2518 in 2500a does not start until the task 2506 in 2500a has been completed. At this point in this example, the process models 2500a and 2500b do not require further simplification or reduction.

Figure 25C:
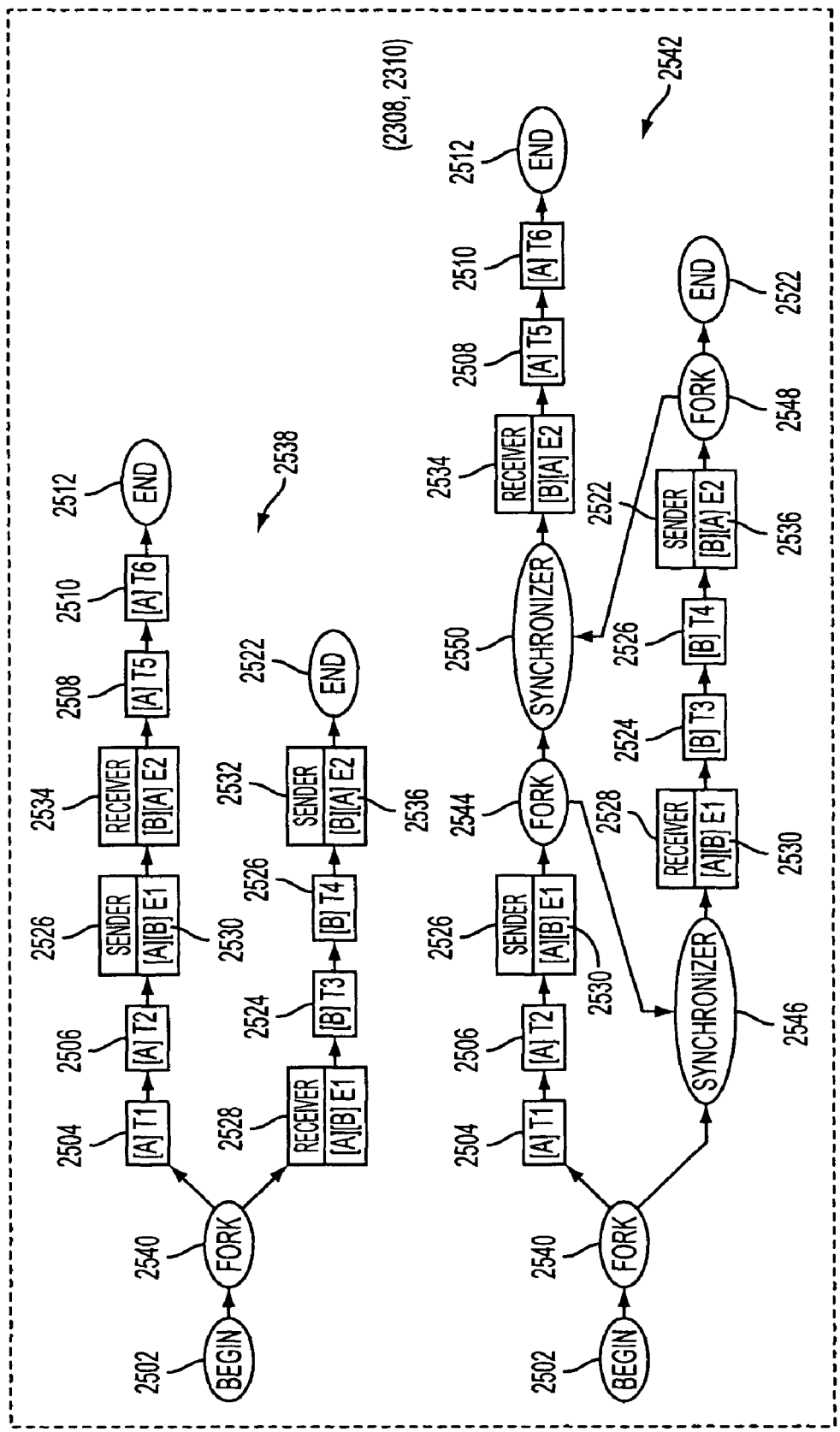

In FIG. 25C, the process models 2500a and 2500b are merged into an intermediate process model 2538 by the insertion of a fork coordinator 2540. Then, control flow is established in a merged process model 2542 by inserting a fork coordinator 2544 after the sender activity 2526, a synchronizer coordinator 2546 before the receiver activity 2528, a fork coordinator 2548 after the sender activity 2522, and a synchronizer 2550 before the receiver activity 2534. The fork coordinators (inserted right after sender activities) and corresponding synchronizer coordinators (inserted right before each receiver activity) are linked with control flows, as shown.

Figure 25D:
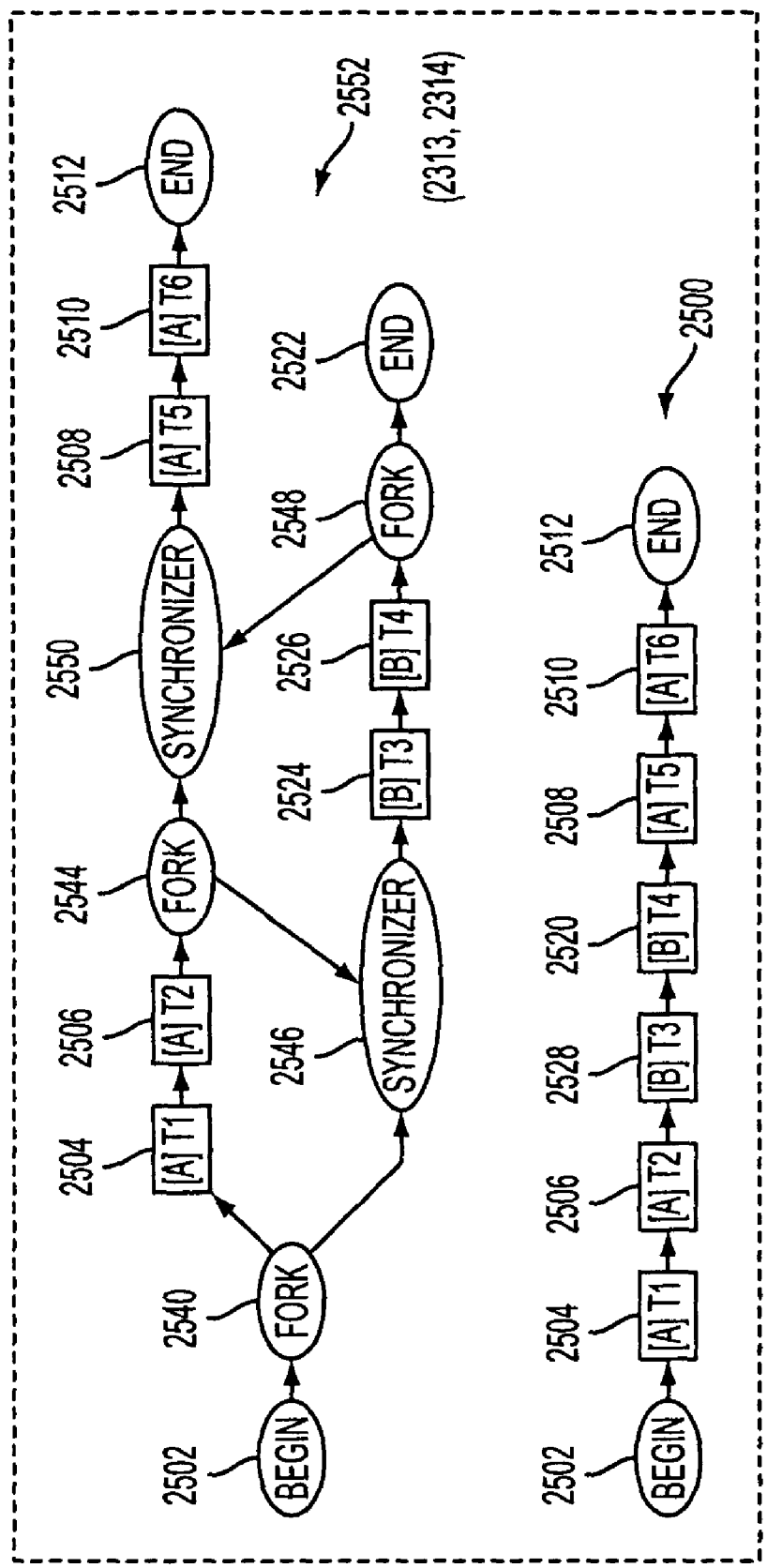

In FIG. 25D, the sender/receiver tasks 2526, 2528, 2532, 2534 are removed to form an integrated process model 2552. Then, a reduction/simplification procedure is executed, for example, to remove fork/synchronizer coordinators. In the example of FIG. 25D, all of the fork/synchronizer coordinators 2544-2550, resulting in the integrated process model 2500 as a sequential process model. Of course, as shown in the following examples, it may not always be possible to remove all of the inserted fork/synchronizer coordinators.

Finally, the integrated process model 2500 is ready to be verified and deployed. For example, the process model 2500 may be deployed as a single process model to replace the original, distributed process models 2500a and 2500b, or may be used to visualize or monitor an execution of the distributed process models.

Figure 26:
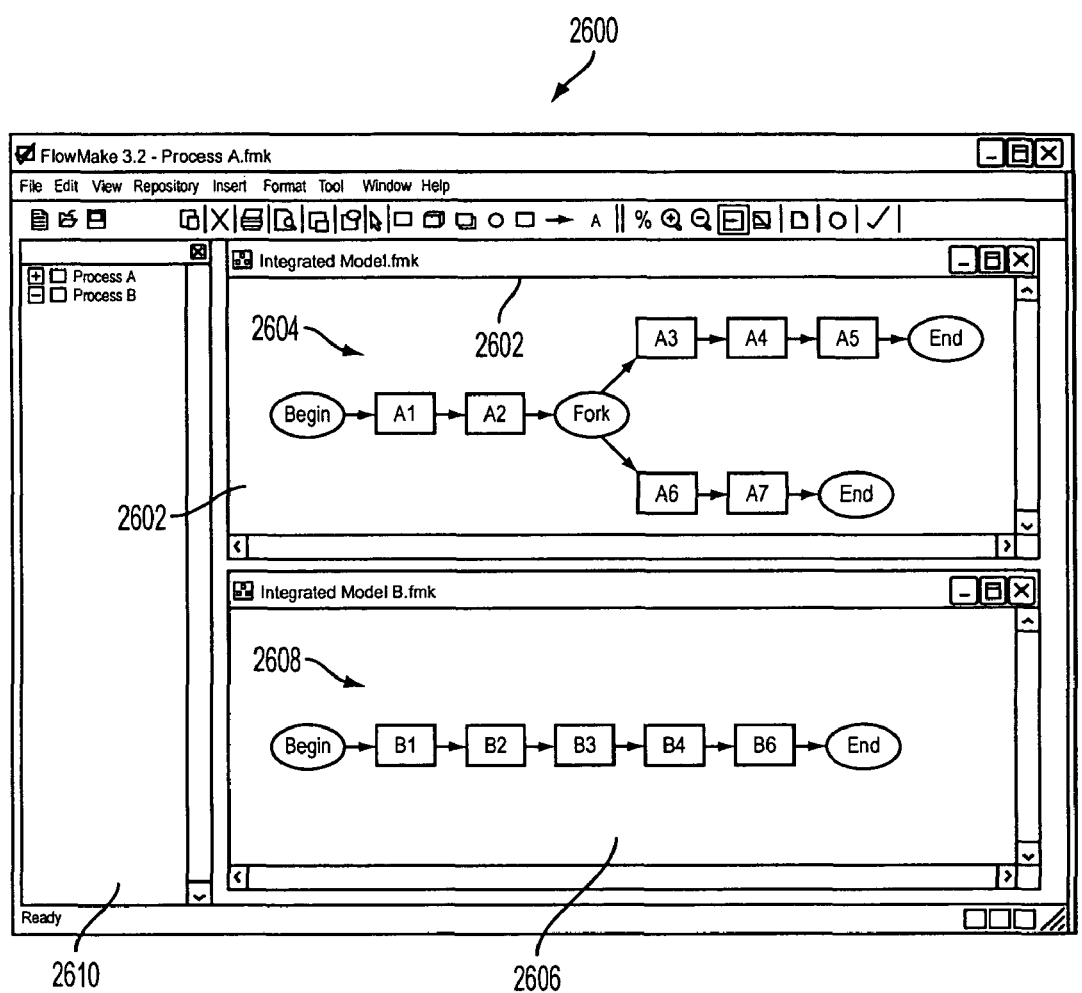
FIGS. 26 and 27 are screenshots of an interface used with the process modeling tool of FIGS. 1 and 22, and/or illustrating a third example of the process of FIG. 23.
Figure 27:
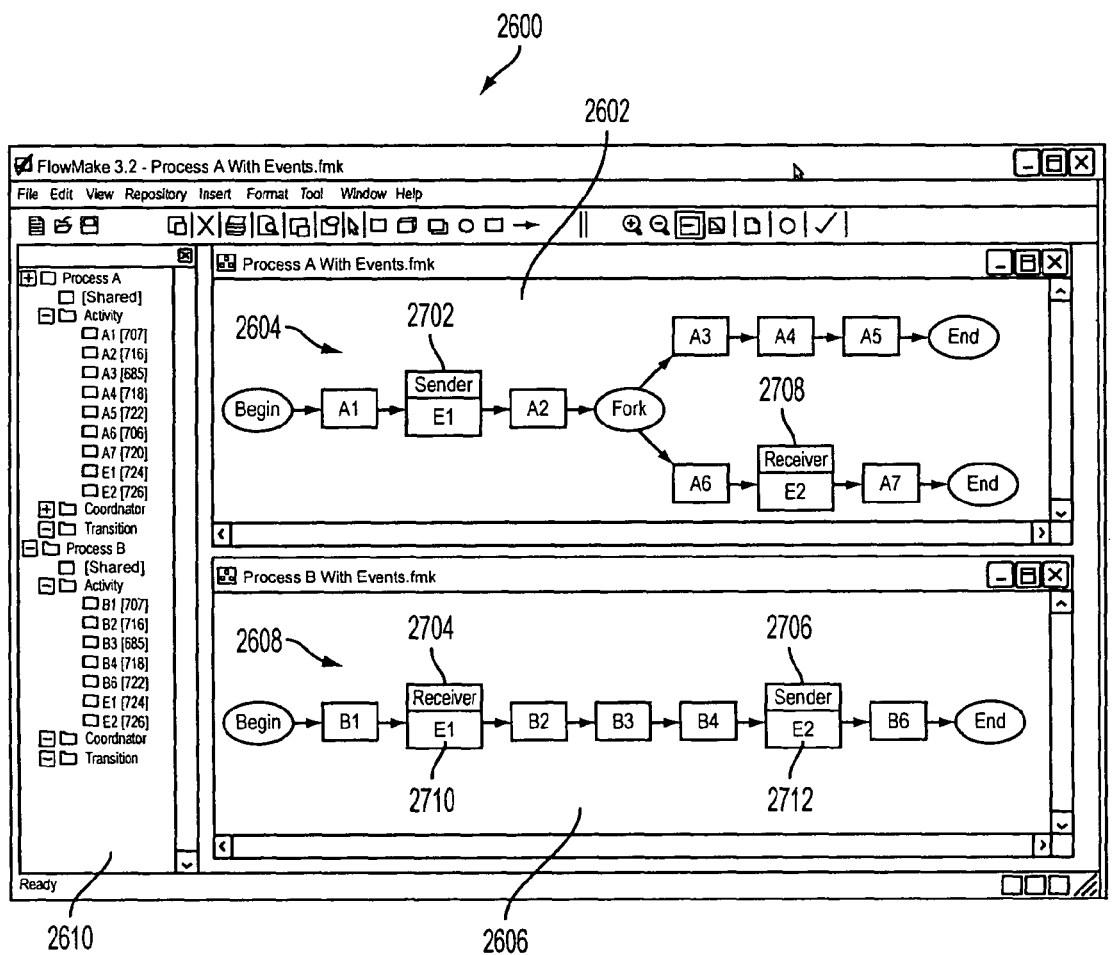

FIGS. 26 and 27 are screenshots of an interface used with the process modeling tool of FIGS. 1 and 22, and/or illustrating a third example of the process of FIG. 23. In FIG. 26, a screenshot 2600 of the interface includes a first window 2602 for showing a first process 2604, and a second window 2606 for showing a second process 2608. A third window 2610 provides hierarchical and other information about the content of the windows 2602 and 2606.

The process designer 104 may thus use the interface of the screenshot 2600 to first model the distributed process models 2604 and 2608. For example, the modeling tool 102 of FIG. 1, the modeling tool 102a of FIG. 3, the modeling tool 102b of FIG. 22, or some other modeling tool, may be used. Alternatively, one or both of the process models 2604 and 2608 may be constructed by, and imported from, some other, external source. The process designer(s) need not consider any potential linking between the distributed process models 2605 and 2608 during their respective construction and design, and is only concerned with the respective process execution requirements and inter-dependencies of process tasks, such that the process models may be executed as single process instances on single process execution engine(s).

In FIG. 27, the interface 2600 allows the process designer who seeks to merge the process models 2604 and 2608 into an integrated process model to insert sender and receiver tasks 2702-2708. That is, for example, the user may select the action of inserting a sender/receiver pair from the window 2610, or by clicking on a particular task within the process model(s) to be presented with options for inserting the sender/receiver task before or after that task.

As referenced above, to insert a sender activity in a process model, the process designer identifies a transition in the source process model (e.g., 2604) where control needs to be transferred to the target process model (2608), and inserts the sender activity 2702 on the identified transition. Similarly, the process designer inserts the corresponding receiver activity 2704 on a transition in the target process model.

Generally, each sender event flow activity uniquely pairs with a receiver event flow activity in another process. As above, each sender receiver pair is associated with an event flow identifier. That is, the sender/receiver pair 2702/2704 is associated with an event identifier E1 2710, while the sender/receiver pair 2706/2708 is associated with an event identifier E2 2712.

At this point, the models 2604 and 2608 may be executed together, based on the event flow established by the sender/receiver activities, and pending any possible simplification or redundancy-reduction that may be implemented. For example, FIGS. 28A-28D illustrate techniques for simplifying distributed process models. Additionally, or alternatively, the models 2604 and 2608 may be merged into an integrated process model, in which case the simplification and redundancy-reduction may be useful in completion of the merging process.

Thus, model transformation operations may be applied to simplify distributed process models, either to support the process designer in reducing the complexity of a process design, and/or to simplify the merged process models (2308-2312 in FIG. 23). Such model transformations may be effectuated by changing certain process modeling structures to execution-equivalent, simplified process modeling structures. The process designer may apply such simplification and/or reduction operations selectively and/or iteratively.

It should be understood that the transformation operations presented here are not intended to represent a complete list of possibilities for equivalent transformations. Accordingly, it may be possible to develop and introduce new transformation operations that simplify the process models, while still keeping original control flow functionality intact.

FIGS. 28A-28D show examples for simplifying process models by removing redundant fork/synchronizer structures. For example, in FIG. 28A, a first process model fragment is illustrated, having tasks 2802-2808, as well as a fork activity 2810 and a corresponding synchronizer activity 2812. Here, the fork/synchronizer pair is redundant, because they do not have an effect on an execution of the model fragment.

Figure 28A:
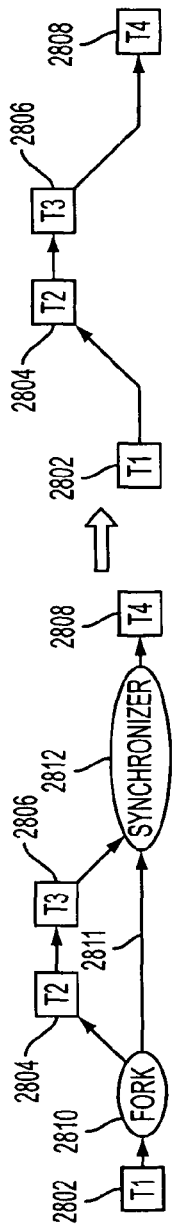
FIGS. 28A-28D and 29 are block diagrams of examples of specified portions of the process of FIG. 23.

Generally, in order to identify redundant fork and synchronization structures, transitions are identified that directly connect a fork and a synchronizer coordinator node. If there exists another closed sub-graph between two such nodes (e.g., here, the tasks 2804 and 2806), the direct transition 2811 is marked as redundant, and removed. If, after the reduction, the fork and synchronizer nodes 2810 and 2812 transform to sequence structure, they are also removed from the graph, as shown in FIG. 28A.

Figure 28B:
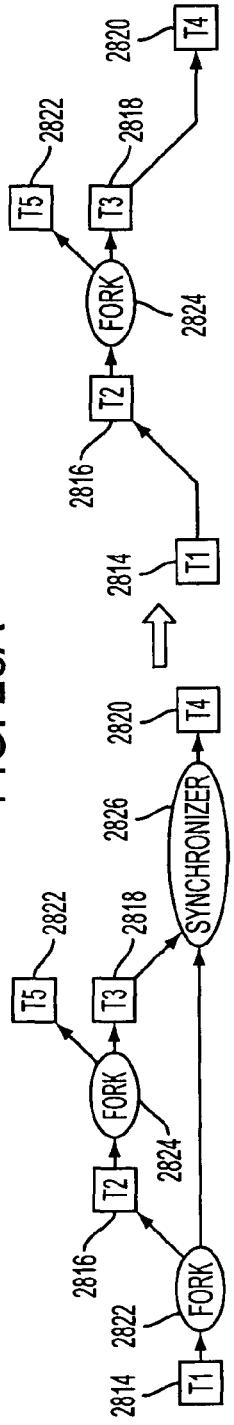

In FIG. 28B, in which a process model fragment includes tasks 2814-2820, as well as fork activities 2822 and 2824, and a synchronizer node 2822/2824, a sub-graph formed by the task 2822 is not closed. In this case, the fork node connected to the task 2822 is not removed. However, the transition between the fork/synchronizer pair 2822/2826 is redundant and may be removed.

Figure 28C:
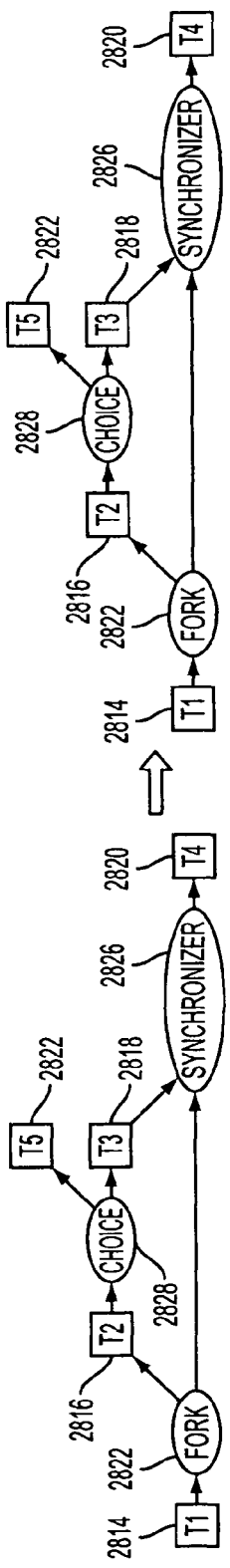

FIG. 28C is similar to FIG. 28B, except that, in contrast, the sub graph is not closed because of a choice node 2828, rather than the fork node 2824. As a result, the fork/synchronizer 2822/2826 transition is not redundant, and, rather, represents a potential deadlock situation in the model. Accordingly, as shown in FIG. 28C, the fork/synchronizer 2822/2826 transition is not removed.

Figure 28D:
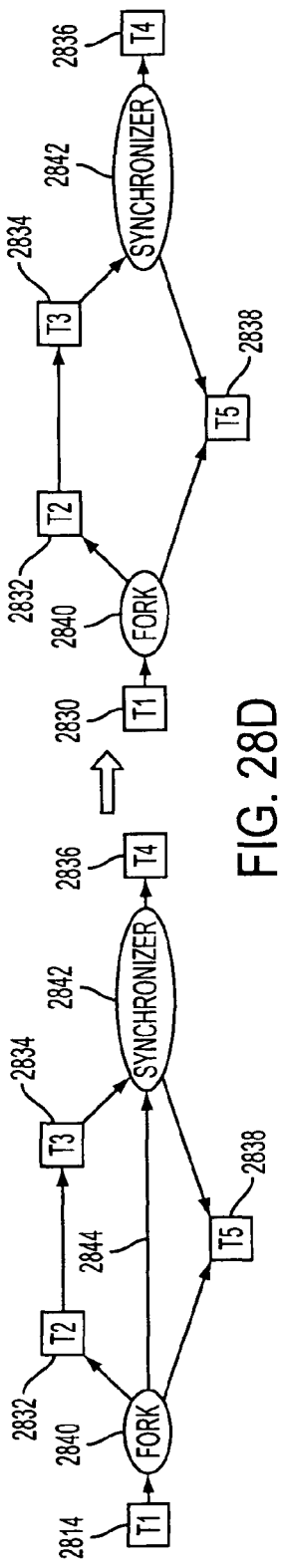

In FIG. 28D, an example is shown in which a process model fragment includes tasks 2830-2838, as well as a fork coordinator 2840 and a synchronizer coordinator 2842. Specifically, the fork coordinator 2840 is connected to the synchronizer coordinator 2842 by multiple sub-graphs, including the tasks 2832/2834, the task 2838, and a transition 2844. The transition 2844 is redundant, and may be removed, while the remaining sub-graphs, and the fork/synchronizer coordinators 2840/2842 remain in the model.

As shown in FIGS. 28A-28D, then, a joining of distributed process models by event flow, and/or a merging of multiple distributed process models into an integrated process model, may result in certain structures, particularly fork/synchronizer structures, that may increase a complexity of the result, without impacting an execution of the process. By identifying such structures, and then removing them, the resulting process model(s) may be simplified and improved, without changing overall control flow constraints of the process model(s).

Figure 29:
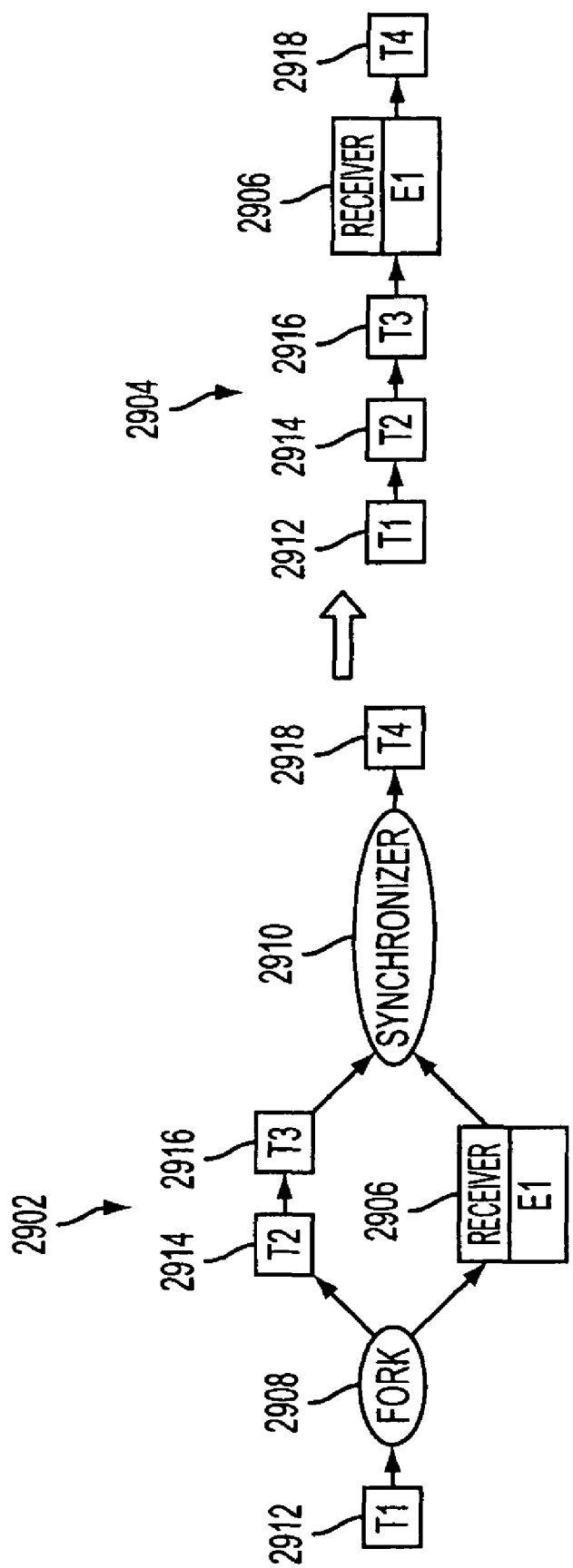

Similarly, FIG. 29 illustrates another situation in which modeling and/or merging of distributed process models results in needlessly complex process model(s). In particular, FIG. 29 illustrates a situation in which a first version 2902 of a process model (fragment) includes a parallel structure, while a second version 2904 of the process model reflects a transformation of the parallel structure into a serial, or sequence, structure.

In particular, the first version 2902 includes a receiver activity 2906 between a fork activity 2908 and a synchronizer activity 2910. In such situations, in which a receiver activity has a a preceding fork coordinator and a proceeding synchronizer coordinator, the receiver activity (here, the receiver activity 2906) may be moved after the synchronizer node (2910). Then, in the example of FIG. 29, the result is that the fork and synchronizer activities 2908/2910 are turned into sequential structures, which then can be reduced as a follow-up reduction process, according to the principles discussed above with respect to FIGS. 28A-28D. The result is a sequential process model of the tasks 2912-2918, along with the receiver activity 2906, as shown.

In the examples of FIGS. 26-29, and as should be understood from the above descriptions of FIGS. 22-25, the modeling and simplification/reduction of distributed process models into event-driven process models may continue with the merging of the distributed process models.

For example, the distributed process models that need to be merged may be viewed within the interface 2600, without connecting them. For example, a copy and paste functions of the modeling tool 102b may be used. Additionally, or alternatively, automated support may be implemented in the modeling tool 102b to carry out this functionality.

Then, in order to connect and merge distributed models, a fork coordinator may be inserted right after a sender activity, and a synchronizer coordinator right before a receiver activity. As described, this step is prepares the distributed process models to replace event-driven message-exchange activities (i.e., sender and receiver activities) with control-flow fork and synchronizer coordinators.

After inserting the fork and synchronizer coordinators, pairs of corresponding sender and receiver activities are identified in the distributed models, and control flow links are inserted between corresponding fork and synchronization coordinators. The result is a merged or integrated process model.

Then, the sender and receiver activities are removed, and further simplification and reduction may be performed, along the lines discussed above with respect to FIGS. 28A-28D. For example, redundant fork and synchronizer structures that are introduced as a result of the merging process may be removed. Finally, the resulting integrated process model may be deployed for execution, or for viewing/monitoring of the overall process by the individual entities involved in executing the various tasks.

The described integration approach allows a process designer to select two or more independently defined process definitions that make use of event flow for inter-process coordination, and merge them as a single process definition, conveniently and automatically. Using this approach, the process designers may define context or participant-specific process models, and ensure that these process models meet their specific, respective requirements. After that, the process designer may place event flow activities in these models to ensure that they correctly interact with all other process instances in a distributed process management environment. The independent process models may be changed, as long as the event flow activities are not disturbed. The process modeling tool implementing the approach described herein may allow the process designer to merge the event-driven distributed process definition arbitrarily.

As a result, distributed process models may be conceptually modeled and maintained, linked through event-driven flow integration, and executed in their independent execution environments and partitions. All of, or a subset of, the distributed process models may be automatically merged into an integrated process model.

In some implementations, there is a one-to-one mapping between tasks in the integrated process model and distributed process models. Control flow may be used for intra-process coordination, and event flow for inter-process coordination. Thus, the process designer has the capability to change the distributed process models, depending on, for example, changing business needs, and use the process modeling tool again to regenerate a new integrated process model(s). Additionally, the configuration of distribution of the models may be changed and controlled by the process designer, as needed.

In particular, for example, it may be the case that a process designer begins with a number of distributed process models, and merges the distributed process models into an integrated process model, using the modeling tool 102b of FIG. 22, for testing and verification. Then, the process designer may use the modeling tool 102a of FIG. 3 to re-distribute process models in a different, and more preferred manner. Meanwhile, the integrated process model may be maintained for monitoring and visualization of the process as a whole.

In more elaborate examples, implementations exist in which, for example, three distributed process models are merged into a single, integrated model. From the integrated process model, five or more distributed process models may be obtained and deployed. Later, two of the five distributed process models may need to be merged, which may be performed without disruption of the remaining three distributed process models.

Such processes of merging distributed process models, and distributing integrated process models, may be performed in many combinations and iterations, in order to achieve a desired result. In such cases, the modeling tool(s) described herein ensure that the integrity of the process models is maintained. For example, simple merging of distributed process models, without the techniques described herein, may result in faulty control flow within the resulting integrated process model (e.g., a fork node without a corresponding or properly-placed synchronizer node), or may result in a needlessly complex model.

Conversely, simply breaking out portions of integrated process models to obtain distributed process models, without the techniques described herein, may result in faulty event flow. For example, a sender task may be inserted, without a corresponding receiver task. Using the techniques described herein, however, a process designer may be assured that process models may be merged or distributed in an easy, automatic, and reliable way, and may thus obtain advantages that are inherent both to distributed and merged process models, and to virtually any desired combination thereof.

A number of implementations have been described. Nevertheless, it will be understood that various modifications may be made. Accordingly, other implementations are within the scope of the following claims.

What is claimed is:

1. A workflow system comprising
a storage medium
a design tool operable to access the storage medium and operable to display an integrated process model that includes a progression of tasks to obtain a desired result;
partition assigner operable to assign a first partition identifier associated with a first entity to a first set of the tasks, and to assign a second partition identifier associated with a second entity to a second set of the tasks;
a control transfer identifier operable to determine control transfer points at which, within the progression of tasks, partition assignment changes between the first partition identifier and the second partition identifier, such that a first distributed process model is defined with respect to the first set of the tasks and the first entity, and a second distributed process model is defined with respect to the second set of the tasks and the second entity, wherein the first distributed process model of the first entity is incompatible with the second distributed process model of the second entity; and
an event flow assignment system operable to insert event flow coordinators into the first distributed process model and the second distributed process model, based on the control transfer points, such that, at run-time, the first distributed process model and the second distributed process model are executed independently and in synchronization with one another to obtain the result of the integrated process model;
wherein the control transfer identifier is operable to insert a plug-point task into the integrated process model, based on the control transfer points, and is further operable to duplicate each of the plug-point tasks to obtain plug-point task pairs, wherein each of the first distributed process model and the second distributed process model includes one of the plug-point tasks within the plug-point pair;
wherein each of the plug-point tasks within the plug-point pair is associated with an event identifier that is unique to the plug-point pair; and
wherein the event flow assignment system is operable to transform each of the plug-point tasks forming multiple plug-point pairs into a sender task or a receiver task, such that plug-point task pairs are transformed into sender-receiver pairs, and wherein the event identifier of each of the plug-point pairs is associated with a corresponding one of the sender-receiver pairs.

2. The system of claim 1 wherein the control transfer identifier is operable to traverse the progression of tasks and determine that a source task is associated with the first partition identifier and is in consecutive sequence with a coordinator task that coordinates an order of the progression of tasks, and further operable to continue traversing the progression of tasks past the coordinator task until a target task of the source task is reached,
wherein the control transfer identifier is operable to identify a transition between the source task and the target task as a control transfer point, when the target task is associated with the second partition identifier.

3. The system of claim 2 wherein the control transfer identifier is operable to reduce the first distributed process model by removing the second set of tasks therefrom, without removing the coordinator task.

4. The system of claim 1 wherein the event flow assignment system is operable to determine whether a sender or receiver task replaces a selected plug-point task, based on a direction of event flow between the first distributed process model and the second distributed process model.

5. The system of claim 1 wherein the integrated process model includes control flow constraints that maintain an order and validity of the tasks, and wherein the control flow constraints are maintained with respect to an execution of the first distributed process model and the second distributed process model.

6. The system of claim 1 comprising a deployment system for deploying the first distributed process model and the second distributed process model for independent execution on a first process execution engine and a second process execution engine, respectively.

7. The system of claim 1 comprising a monitoring tool for viewing a definition and status of the integrated process model, with respect to an execution of the first distributed process model and the second distributed process model.

8. The system of claim 1 wherein the tasks of the integrated process model have a one-to-one relationship with the tasks of the first distributed process model and the second distributed process model.

9. The system of claim 1, wherein the progression of tasks comprises a workflow for producing a good in a manufacturing plant.

10. The system of claim 1, wherein the progression of tasks comprises a workflow for obtaining goods.

11. An process-modeling apparatus comprising:
a storage medium having instructions stored thereon, the instructions including:
a first code segment for selecting an integrated process model that includes tasks, coordinator tasks governing a progression of the tasks, transitions between the tasks and the coordinator tasks, and control flow constraints for ensuring a validity of execution of the integrated process model for obtaining a result;
a second code segment for assigning one of a plurality of partition identifiers, each partition identifier being associated with one of a plurality of entities, to each of the tasks, to thereby associate each of the tasks with at least one of the entities;
a third code segment for designating control transfer points at which control transfers between two of the entities by associating each task and its assigned partition identifier with the ensuing partition identifier of each immediately consecutive task, excluding the coordinator tasks, wherever the ensuing partition identifier is different from the assigned partition identifier; and
a fourth code segment for extracting distributed process models from the integrated process model, based on the partition identifiers and control transfer points, wherein execution of the distributed process models conforms to the control constraints for, and obtains the result of, the integrated process model; and
wherein the fourth code segment includes a fifth code segment for inserting sender and receiver event-flow pairs into the distributed process models, wherein the event-flow pairs govern transfer of control between the entities, to thereby trigger operation of each entity's respective distributed process model.

12. The apparatus of claim 11 wherein the fourth code segment includes:
a fifth code segment for inserting plug-point tasks into the integrated process model, based on the control transfer points, wherein each of the plug-point tasks includes a source partition identifier and a target partition identifier that are determined from a corresponding control transfer point; and a sixth code segment for extracting the distributed process models, based on the plug-point tasks, wherein each plug-point task is duplicated for inclusion in two of the distributed process models that correspond to the source partition identifier and the target partition identifier.

13. The apparatus of claim 12 wherein the fourth code segment further includes a seventh code segment for transforming one of a pair of the duplicated plug-point tasks into a sender activity, and for transforming the other of the pair of the duplicated plug-point tasks into a receiver activity, based on a direction of the integrated process model.

14. The apparatus of claim 13 wherein the pair of duplicated plug-point tasks, the sender activity, and the receiver activity are associated with an event identifier.

15. The apparatus of claim 11 wherein the fourth code segment includes a fifth code segment for removing selected tasks from a selected distributed process model having an associated partition identifier, where the selected tasks are associated with other partition identifiers that are different from the associated partition identifier of the selected distributed process model.

16. The apparatus of claim 11, wherein each entity's respective distributed process model is incompatible with the other entities' respective distributed process model.

17. The apparatus of claim 11, comprising a ninth code segment for changing the distributed process models to execution-equivalent, simplified process models.

18. A system comprising:
a storage medium storing instructions;
a process modeling tool executable by said instructions, the process modeling tool including:
a first display window for displaying an integrated process model having task nodes, coordinator nodes, and transitions between the task nodes and coordinator nodes;
an interface tool for selecting each of the task nodes and assigning either of a first partition identifier or a second identifier to each of the selected task nodes;
a transition identification tool for inserting a transition marker after each task node at which an outgoing transition from a first task node having the first partition identifier is an ingoing transition at a second node having the second partition identifier, excluding the coordinator nodes;
a process model generator for generating, from the integrated process model and based on the transition markers, a first distributed process model that includes tasks having the first partition identifier, and a second distributed process model that includes tasks having the second partition identifier; and
at least a second window for displaying the first distributed process model and the second distributed process model, in which each of the distributed process models includes the transition markers for demonstrating a transfer of control between the first distributed process model and the second distributed process model;
wherein the process model generator is operable to duplicate the plug-point task for inclusion in both the first distributed process model and the second distributed process model, and is further operable to transform each of the duplicated plug-point tasks into a sender or receiver event-flow activity,
wherein the sender and receiver activities include the event identifier associated with their respective plug-point tasks, and dictate transfer of process control between the first and second distributed process models.

19. The process modeling tool of claim 18 wherein the transition identification tool is operable to insert the transition marker as a plug-point task that identifies the first partition identifier, the second identifier, and an event identifier.

20. The process modeling tool of claim 18, wherein the process model generator is operable to transform each of the duplicated plug-point tasks into a sender or receiver event-flow activity based on a desired order of tasks.

* * * * *